(12) United States Patent
Eriksen et al.

(10) Patent No.: US 11,605,940 B2
(45) Date of Patent: Mar. 14, 2023

(54) ELECTRICAL RECEPTACLE FAULT PROTECTION

(71) Applicant: Brainwave Research Corporation, Woodbridge (CA)

(72) Inventors: John Eriksen, Newmarket (CA); Jean-Guy Gagne, Etobicoke (CA); Patrick Belanger, Port Moody (CA)

(73) Assignee: Brainwave Research Corporation, Woodbridge (CA)

( * ) Notice: Subject to any disclaimer, the term of this patent is extended or adjusted under 35 U.S.C. 154(b) by 0 days.

(21) Appl. No.: 17/693,234

(22) Filed: Mar. 11, 2022

(65) Prior Publication Data

US 2022/0209522 A1 Jun. 30, 2022

Related U.S. Application Data

(63) Continuation of application No. 17/241,953, filed on Apr. 27, 2021, which is a continuation of application No. 16/886,345, filed on May 28, 2020, now Pat. No. 11,462,899, which is a continuation of application No. 15/274,469, filed on Sep. 23, 2016, now Pat. No. 10,673,225.

(60) Provisional application No. 62/377,962, filed on Aug. 22, 2016, provisional application No. 62/366,910, filed on Jul. 26, 2016, provisional application No. 62/222,904, filed on Sep. 24, 2015.

(51) Int. Cl.
| | |
|---|---|
| *H02H 3/00* | (2006.01) |
| *H01R 13/713* | (2006.01) |
| *H01R 24/78* | (2011.01) |
| *H02H 9/04* | (2006.01) |
| *H02H 11/00* | (2006.01) |
| *H01R 103/00* | (2006.01) |

(52) U.S. Cl.
CPC ............ *H02H 3/00* (2013.01); *H01R 13/7135* (2013.01); *H01R 24/78* (2013.01); *H02H 9/042* (2013.01); *H02H 11/002* (2013.01); *H01R 2103/00* (2013.01)

(58) Field of Classification Search
CPC ...... H02H 3/00; H02H 9/042; H01R 13/7135; H01R 24/78; H01R 2103/00
USPC .......................................................... 361/42
See application file for complete search history.

(56) References Cited

U.S. PATENT DOCUMENTS

| | | | | |
|---|---|---|---|---|
| 4,210,772 A | * | 7/1980 | Magana | H02G 3/16 174/59 |
| 9,548,574 B2 | * | 1/2017 | Hsu | H01R 13/7038 |

FOREIGN PATENT DOCUMENTS

JP       2004363246 A  * 12/2004  ............. G01R 1/203

OTHER PUBLICATIONS

Machine Translation of Matsumoto Japanese Patent Document JP 2004363246 A Dec. 24, 2004 (Year: 2004).*

* cited by examiner

*Primary Examiner* — Kevin J Comber

(57) ABSTRACT

An electrical receptacle contains a plug outlet that has a pair of contacts for electrical connection to respective hot and neutral power lines. A controlled switch, such as a TRIAC, is connected in series relationship between the outlet contact and the hot power line. Sensors in the receptacle outputs signals to a processor having an output coupled to the control terminal of the controlled switch. The processor outputs an activation signal or a deactivation signal to the controlled switch in response to received sensor signals that are indicative of conditions relative to the first and second contacts.

7 Claims, 41 Drawing Sheets

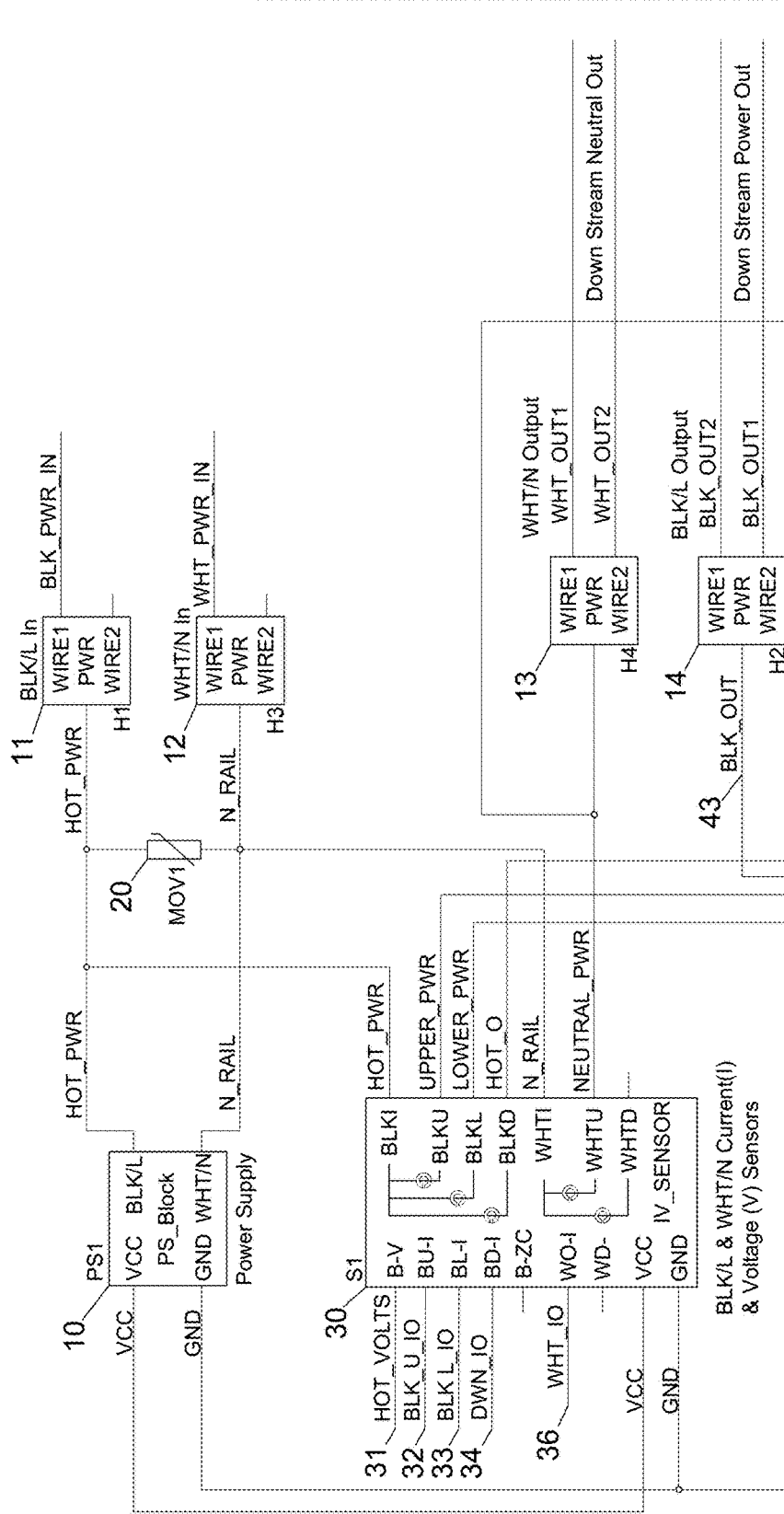
Fig. 6A-A

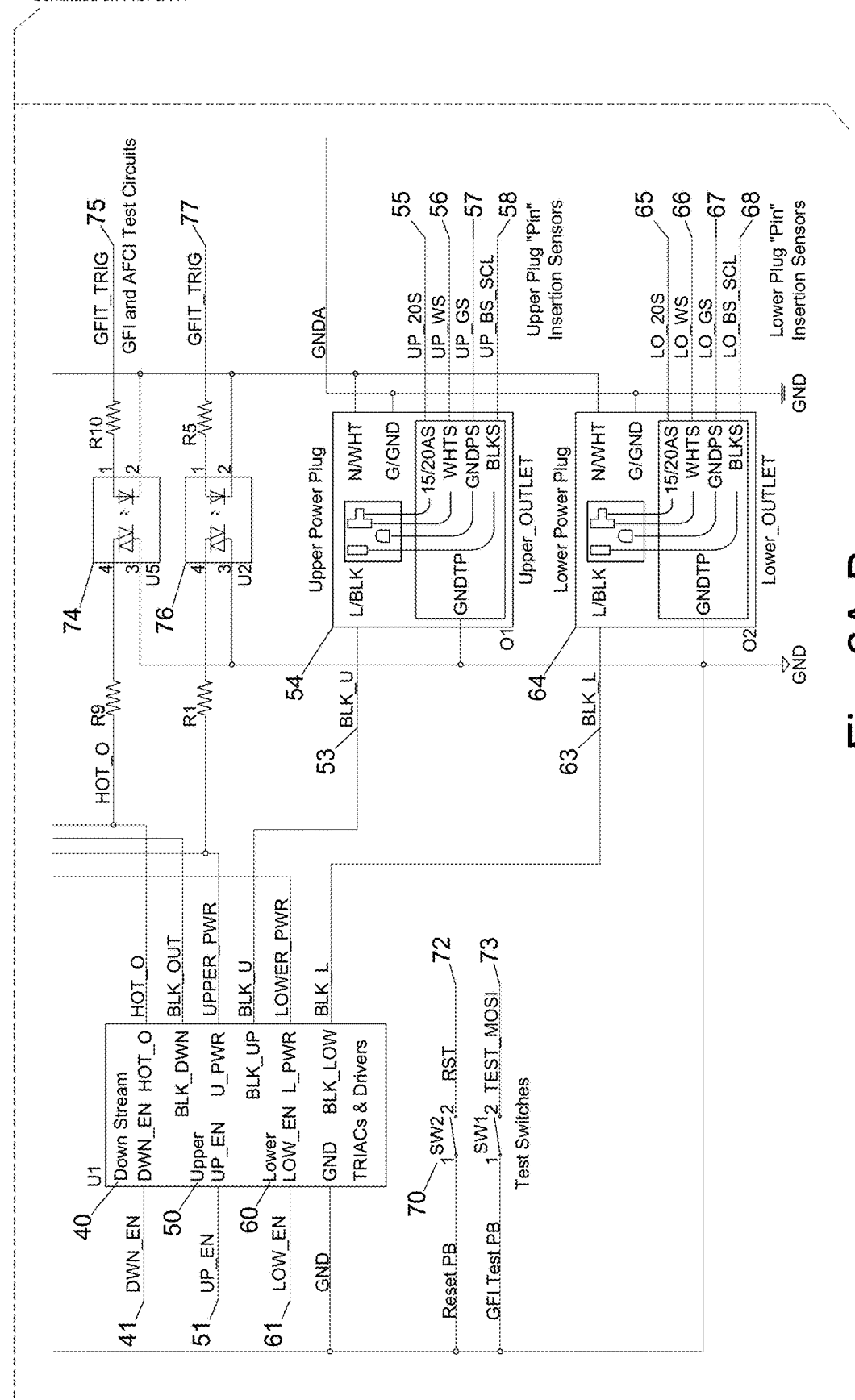
Fig. 6A-B

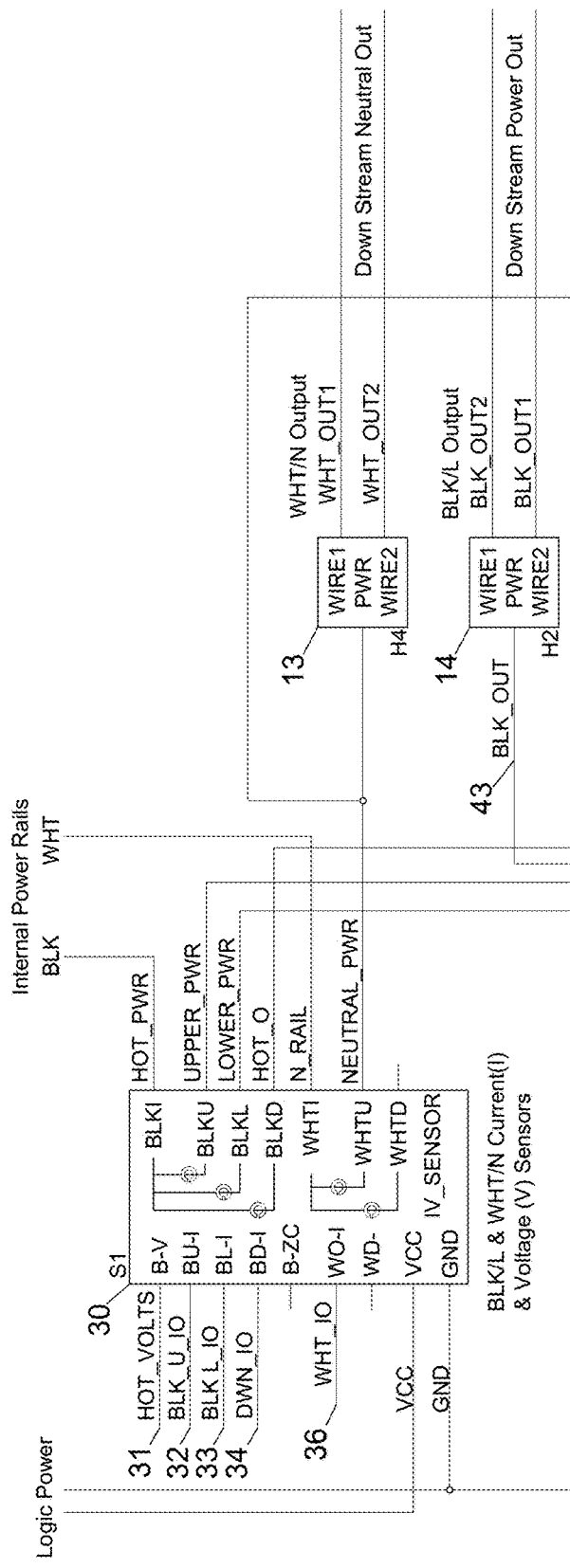
Fig. 7B-A

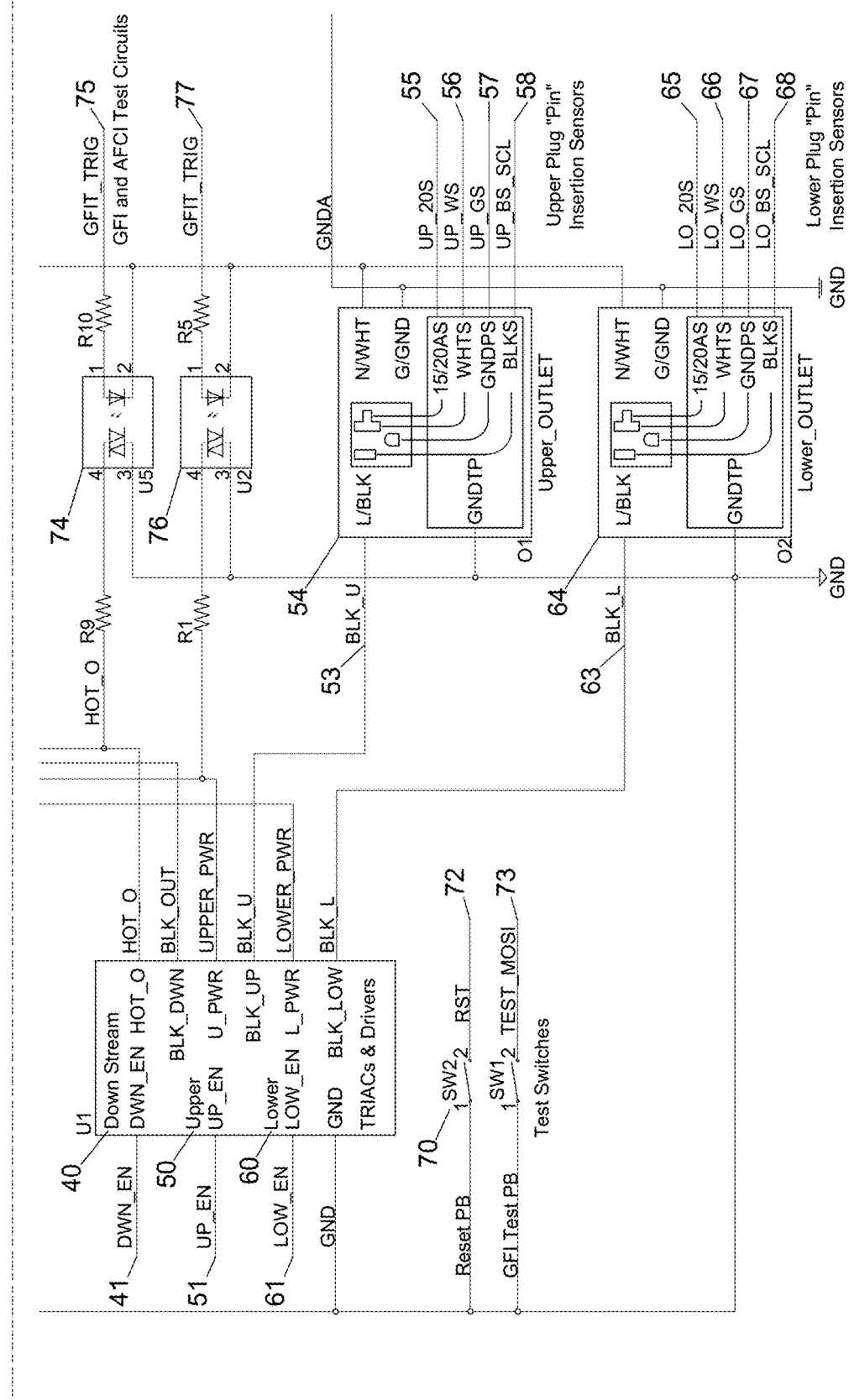
Fig. 7B-B

RAM Data Table

0: Sample Counter
1: BLK Voltage
2: Upper Current
3: Lower Current
4: WHT Current
5: Down Current
6: BLK RMS Voltage
7: Upper RMS Current
8: Lower RMS Current
9: WHT RMS Current
10: Down RMS Current
11: BLK V Peak
12: Upper C Peak
13: Lower C Peak
14: WHT C Peak
15: Down C Peak
16: BLK V Timer
17: Upper Timer
18: Lower Timer
20: Down Timer
30: ADC Timer
31: Samples Permissible
50 to 60: Flags & internal parameters
100 to 199: BLK Voltage Samples
200 to 299: Upper Current Samples
300 to 399: Lower Current Samples
400 to 499: WHT Current Samples
500 to 599: Down Current Samples

FIG. 18

ELECTRICAL RECEPTACLE FAULT PROTECTION

This application is a continuation application of U.S. application Ser. No. 17/241,953, filed Apr. 27, 2021, entitled "Electrical Receptacle Fault Protection," which is a continuation application of U.S. application Ser. No. 16/886,345, filed May 28, 2020, entitled "Electrical Receptacle Fault Protection," which is a continuation application of U.S. application Ser. No. 15/274,469, filed Sep. 23, 2016, entitled "Electrical Receptacle Fault Protection," which claims the benefit of priority to U.S. provisional applications 62/222,904, filed Sep. 24, 2015, 62/366,910, filed Jul. 26, 2016, and 62/377,962, filed Aug. 22, 2016, all the contents of which are herein incorporated by reference into the Detailed Disclosure herein below.

BACKGROUND

This disclosure is related to protection of electrical receptacles, more particularly, to tamper resistance, arc fault protection, ground fault protection, overcurrent protection, and surge suppression for electrical receptacles and similar devices.

Conventional tamper resistive (TR) electrical receptacles employ mechanical means such as spring loaded gates, shutters or sliders on each of the outlet sockets to prevent insertion into the outlets of objects other than prongs of electrical plugs. Shutters or gates on each outlet socket must be pushed simultaneously to allow prong entry. Preclusion of foreign objects serves to avoid the likelihood of shock, burn or electrocution.

Conventional TR devices, however, have inherent disadvantages. Excessive force may be required to open the gates, as the plug blades must be perpendicular to the front face of the outlet and well aligned prior to simultaneous opening of the shutters. Often an equivalent force must be exerted on each blade in order to open the gates. These receptacles are thus difficult to use when located close to the floor or behind an article of furniture, especially for elderly and special needs individuals. Once the blades pass a tamper resistance gate and make contact with the sprung outlet terminals, the blades attain power even though they may not be completely inserted. Until the blades are fully removed past the tamper resistant gates or shutters the blades remain energized. Exposed blades prior to complete insertion or removal can result in arcing and electric shock. Moreover, with a live load connected with the TR receptacle, an arc fault circuit interrupter (AFCI) may false trip.

Various conventional circuit interruption devices exist for arc fault protection, ground fault protection, overcurrent protection, and surge suppression. An arc fault is an unintentional electrical discharge in household wiring characterized by low and erratic voltage/current conditions that may ignite combustible materials. A parallel current fault results from direct contact of two wires of opposite polarity. A ground current fault occurs when there is an arc between a wire and ground. A series voltage fault occurs when there is an arc across a break in a single conductor. When a ground or arc fault is detected, power is conventionally terminated on the circuit by an AFCI or ground fault circuit interrupter (GFCI) disconnecting both receptacle outlets and any downstream receptacles.

The devices include transformers that combine magnetic representations of the current in an analog form. Transformer current sensors are limited to a fixed current value and time interval. Upon sensed voltage imbalance of greater than a specified level, such as 6 mV, power is interrupted by electromechanical means, such as solenoid tripping a locking mechanism. The conventional devices lack capability to disconnect outlets individually, independently of other loads connected to the outlet.

A normal arc can occur when a motor starts or a switch is tripped. Only current flow imbalance between the hot and neutral conductors is detected by conventional circuit interrupters. The individual current line difference is not monitored. Conventional circuit interrupters trip frequently by false triggers, as they lack adequate capability to distinguish between normal arcing and unwanted arcing. Transformer current sensors are limited to a fixed current value and time interval. Upon sensed voltage imbalance of greater than a specified level, such as 6 mV, power is interrupted by electromechanical means, such as solenoid tripping a locking mechanism. The conventional devices lack capability to disconnect outlets individually, independently of other loads connected to the outlet.

As indicated above, needs exist to improve the usability and safety of existing conventional receptacles. Existing conventional GFCI and AFCI receptacles do not provide detail about a fault. Currents are not being individually measured. Existing conventional GFCI and AFCI receptacles do not measure, monitor and control current and voltage, and do not protect against overcurrent, under voltage or over voltage at the outlet. It would be desirable to limit interruption of power to affected outlets, receptacles or devices only on the circuit, based on the type and location of the fault. Overcurrent protection at the outlet is preferable to the protection provided by the circuit breaker as it would avoid delay as well as associated voltage losses associated with wire resistance along increasing wire length. Such voltage losses impede the ability of existing circuit breakers to detect a short circuit at a remote location.

There is a need for overcurrent protection that more effectively distinguishes between short circuits, momentary overcurrent and overload so that false triggering can be avoided. There is a need for a receptacle that can provide local overcurrent protection as well as protection against arc faults and ground faults.

Conventional existing dual amperage receptacles will supply up to 20 A to an appliance rated for 15 A and potentially cause an overcurrent event. There is a need for a dual amperage (e.g. 15 A/20 A) receptacle that restricts amperage supplied to a lower rated plug when a low rated appliance is plugged in.

Current measurement accuracy is important for effective ground and arc fault detection as well as overcurrent protection. Conventional receptacles are factory calibrated and not re-calibrated by the device once installed. There is a need for continued self-calibration of receptacles and outlets.

If the hot and neutral conductors have been incorrectly wired to the receptacle terminals, electrical equipment plugged into the receptacle can be damaged. Incorrect wiring can cause short circuits with potential to harm the user through shock or fire. There is a need to warn the receptacle installer that the receptacle has been incorrectly wired and to preclude supply power to the load in such event. It would also be desirable that the outlet not be operational if the black wire and white wire are incorrectly connected to the opposite terminals.

Conventional outlets lack surge protection features, which are typically provided by power strips and power bars. A power strip is inserted into a receptacle after which a sensitive electrical device is plugged into one of the power strip extension receptacles. Use of the power strip tends to lead to a false impression that it is safe to insert additional loads that more than permissible. There is a need for surge protection at the electrical receptacle to avoid use of a dedicated power strip and its attendant disadvantages of power loss and limited life.

It is possible to plug a GFI extension cord or a power strip with a comprised ground prong into a two blade ungrounded receptacle by using a "cheater plug" that allows the ground prong to be inserted without a present ground. It is also possible to replace an ungrounded two blade electrical receptacle with one with ground socket without actually providing a conductor to ground pin. Conventional existing receptacles do not indicate that the supply side safety ground is present or if it is compromised. There is a need to protect the user and the equipment in the event of an incorrect grounding of an electrical receptacle. If no safety-ground is present and a wire conductor is exposed (e.g. has degraded insulation) the user may act as the ground path and receive a shock.

Traditionally, GFCI manual testing is accomplished by injecting a current imbalance. A thoroid type transformer is typically used to measure the current imbalance between neutral and hot conductors. The monitoring circuit indicates that an imbalance has occurred without indicating the amount of imbalance. This method is limited in that the absolute value of current imbalance is not available. There is merely a voltage level that indicates that an imbalance or fault has occurred. There is a need for more comprehensive self-testing and interruption of supply power to downstream and/or receptacle loads upon fault detection or an internal component fault.

SUMMARY OF DISCLOSURE

The needs described above are fulfilled, at least in part, by an electrical receptacle having a plug outlet that has first and second contacts for electrical connection to hot and neutral power lines. A controlled switch, such as a TRIAC, is connected in series relationship with the hot power line. Sensors are coupled to respective plug outlet contacts. Sensor signals are input to a processor having an output coupled to the control terminal of the controlled switch. The processor outputs an activation signal or a deactivation signal to the controlled switch in response to received sensor signals that are indicative of conditions relative to the first and second contacts. When a plug is inserted into the plug outlet, the processor can output the activation signal at or near the zero volt level of the alternating current waveform. If the electrical receptacle is incorrectly wired, the processor will preclude outputting an activation signal.

The receptacle may include a second plug outlet with a second controlled switch connected in series relationship to the hot power line. Sensors are coupled to the contacts of the second plug outlet to supply input to the processor. The processor outputs an activation signal or a deactivation signal to the second controlled switch in response to received sensor signals that are indicative of conditions relative to the contacts of the second plug outlet. The processor signals output to the first and second controlled switches are independent of each other. Deactivation of the receptacle would not affect another receptacle connected across the hot and neutral power lines. Deactivation signals to the controlled switches are applied before a mechanical breaker can be activated. Protection against voltage surge can be provided by a varistor coupled across the hot and neutral lines. The receptacle may include a downstream electrical connection to a second electrical receptacle having a second voltage surge protection circuit, thereby providing a tighter voltage capping tolerance. An interrupt detection circuit is coupled to the contacts of each plug contact and provides an input to the processor. In response to an interrupt detection circuit, the processor outputs a deactivation signal to the respective controlled switch.

A mechanical switch mechanism can be electrically connected to the power source. A detector, such as an optical switch, corresponding to each prong socket contact, is connected to the switch mechanism and the power source when the switch mechanism is activated by insertion of one or more objects in the plug outlet. The processor generates an activation signal to the control terminal of the controlled switch of the prong socket in response to two or more objects being detected by the plurality of detectors within a specified time. The switch mechanism may comprise a mechanical switch, corresponding to each prong socket, which comprises a switch plunger depressed by deflection of a spring contact when an object is inserted in the socket. An indicator may be coupled to the processor to indicate that objects have not been inserted in the plug sockets within the specified time.

The receptacle may include a first circuit board for a hot line prong socket for each plug outlet, with high power control circuitry for electrical connection from the hot line to each hot line prong socket. A second circuit board, spatially separated from the first circuit board includes a neutral line prong socket for each plug outlet, with communication circuitry for electrical connection from a neutral line to each neutral line prong socket. Both circuit boards may be planar and configured parallel to each other.

A current sensor, coupled to the hot power line, can sense ground fault, arc fault or over-current conditions. The current sensor provides input to the processor to output a deactivation signal to the switch control terminal upon indication of such fault conditions. The processor may be mounted on a circuit board housed within the receptacle.

The processor can record a number and intensity of overvoltage occurrences of the receptacle and output an end-of-life indication based on a maximum number threshold or intensity of the overvoltage occurrences. A processor memory is provided to store sampled signals from the power lines. A memory can store criteria for temporal signal imbalance, waveform criteria, minimum values, maximum values, table lookup values, reference datasets and/or Fourier analysis criteria, with which the sampled signals are compared. Such storage may include a minimum monitoring time period of the sampled signals, which is sufficient to detect a possible fault, and a reference lookup table comprising criteria relating to a temporal signal imbalance occurrence of the sampled signals.

The processor can reconstruct waveforms of the sampled signals. From the sampled signals, the processor may determine that a sum of current of all hot lines is not equal to current of a neutral line, or within a set threshold, or determine temporal imbalance from sampled current signals of the hot line. From such determinations the processor can apply a deactivation signal to an associated switch control terminal.

The receptacle may further include a communication subsystem for communicating with a downstream load or a second electrical receptacle that is downstream of the receptacle. Stored current fault criteria may include a threshold for the sum of current of the plug outlet and current downstream of the electrical receptacle. The processor can sample signals at the upstream plug outlet and determine that a fault, such as a ground fault, occurs at the second electrical receptacle. After waiting a specified delay period, the processor may communicate a signal to the downstream receptacle only for deactivation thereof. The specified delay period allows time for the second receptacle to deactivate in response to the fault. A shorter delay period can be imposed for deactivation for a fault at the input of the first receptacle.

A plug orientation sensor may be coupled to the plug contacts. Threshold current fault values for different plug orientations, for example 20 ampere plug orientation and 15 ampere plug orientation, may be stored in processor memory. The processor can determine if the plug outlet has received a plug without a ground prong. The processor, in response to input from the plug orientation sensor, can output a deactivation signal applicable to the respective plug orientation.

The processor is configured to perform self-testing of the electrical receptacle to determine if there is an internal component failure. Self-testing can be performed in an ongoing or periodic routine. The processor is also capable of recalibrating sensors, including voltage and current sensors. Such calibration can be effected by coupling a constant current source to the processor. A deactivation control signal can be generated in response to a fault determination during the self-testing routine.

Additional advantages of the present disclosure will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

Various exemplary embodiments are illustrated by way of example, and not by way of limitation, in the figures of the accompanying drawings in which like reference numerals refer to similar elements and in which:

FIGS. 6A-A, 6A-B, 6B, 7A, 7B-A, 7B-B, 7C together comprise a circuit diagram for AFCI and GFCI and surge protection, taken with the circuit diagram of FIG. 4;

FIG. 18 is a data table for the processor of the example embodiment;

DETAILED DISCLOSURE

Figure 1A:
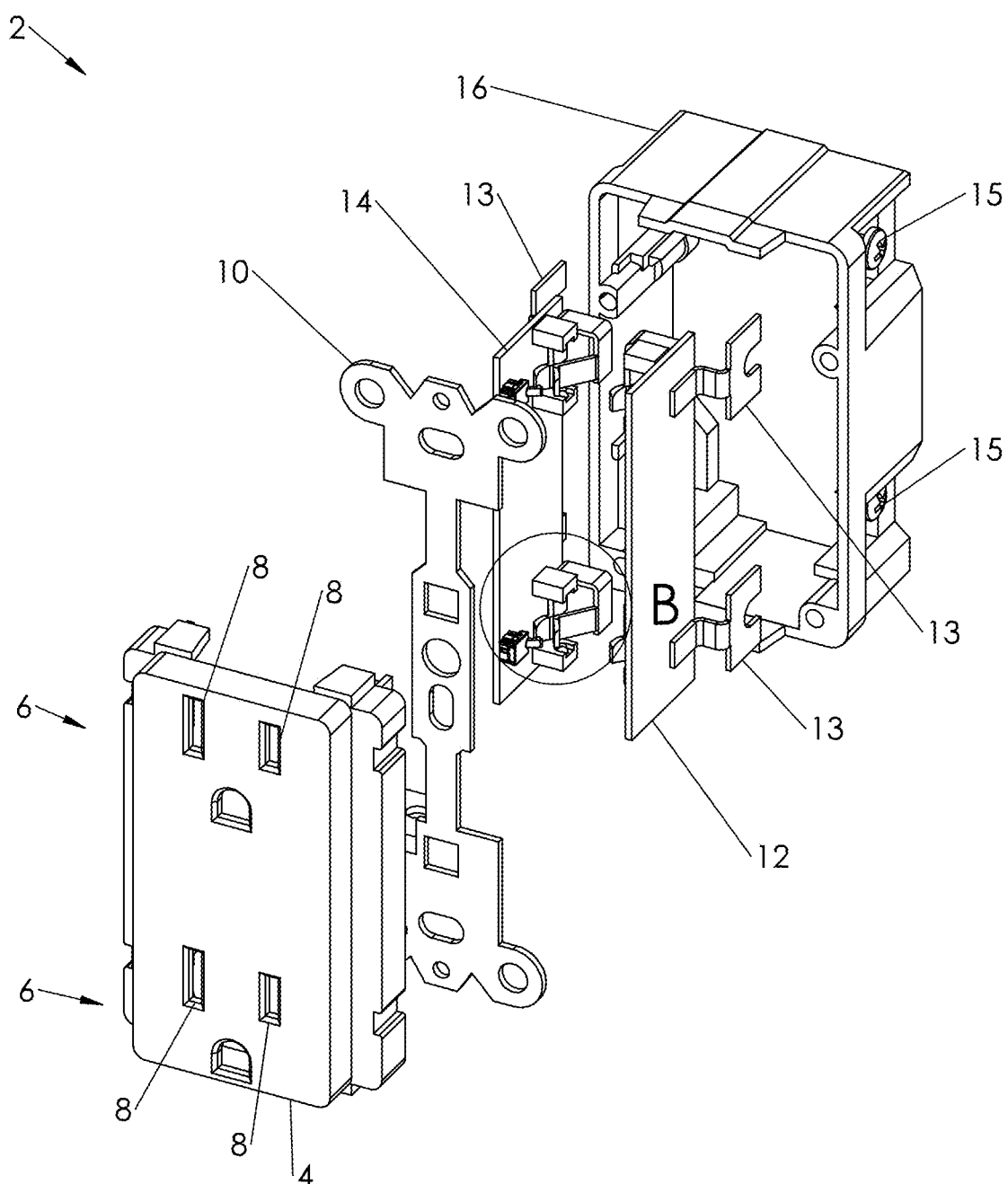
FIG. 1A is an isometric exploded view of a tamper resistant (TR) electrical receptacle in accordance with an example embodiment.
Figure 1B:
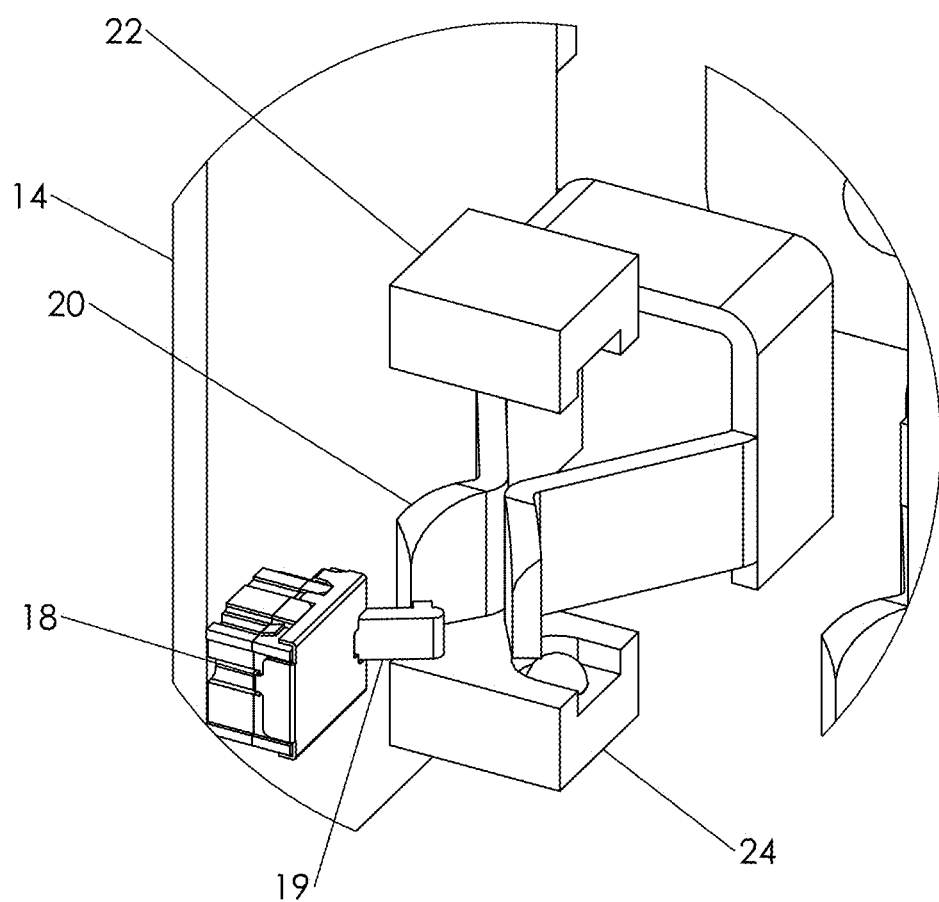
FIG. 1B is a detail view taken from FIG. 1A.
Figure 1C:
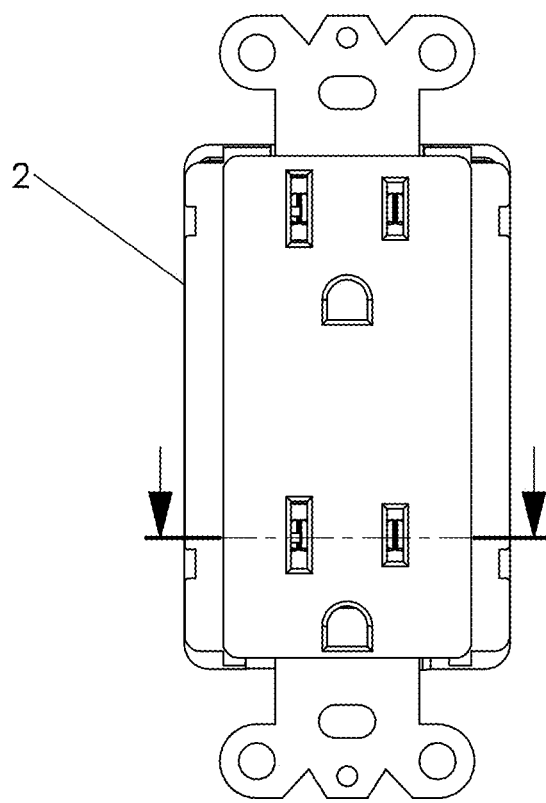
FIG. 1C is a front view of the TR receptacle of FIG. 1A.

FIG. 1C is a front view of receptacle 2 without plug insertion in outlets 6. Referring to the isometric view of FIG. 1A, receptacle 2 includes front housing 4 and rear housing 16. Sockets 8 in front housing 4 serve to receive plug blades for each of two outlets 6. Enclosed within housing 4 and 16 are ground plate 10, neutral circuit board 14, hot circuit board 12 and terminal plates 13. Terminal screws 15 provide fastening to power wires. FIG. 1B is an enlarged detail view of a portion of FIG. 1A. Lever 19 is positioned in the path of a contact 20 of each outlet 6. Detector switch 18, positioned on circuit board 14, can be activated to energize a low voltage circuit by tripping lever 19 when an object has been inserted into the left opening in the socket. An optical sensor, comprising emitter 22 and collector 24 is powered by the low voltage circuit when activated. Two optical sensors are for provided for each outlet 6. The optical sensors are coupled to control circuitry responsive to signals received therefrom. The circuitry permits connection between power terminals 13 and contacts 20 of outlet 6 if optical sensor signals are indicative of non-tamper conditions. Control circuitry for the circuit boards is shown in detail in the circuit diagrams of FIGS. 2, 4, and 6-8.

Figure 1D:
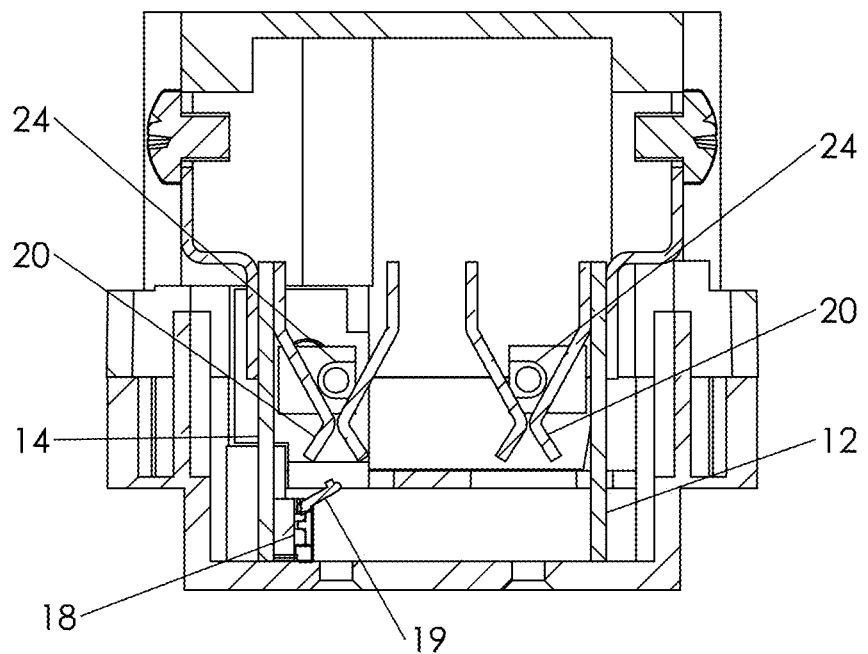
FIG. 1D is a section view taken from FIG. 1C.
Figure 1E:
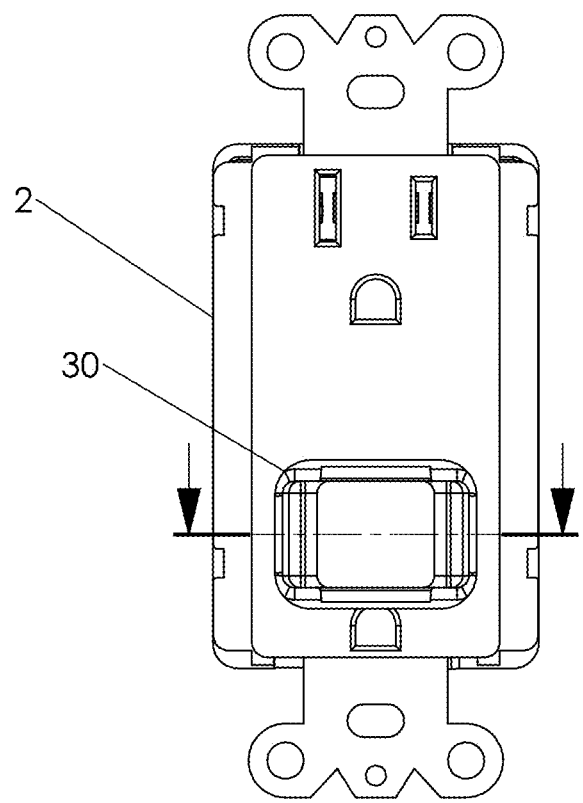
FIG. 1E is a front view of TR receptacle of FIG. 1C shown with a plug inserted.
Figure 1F:
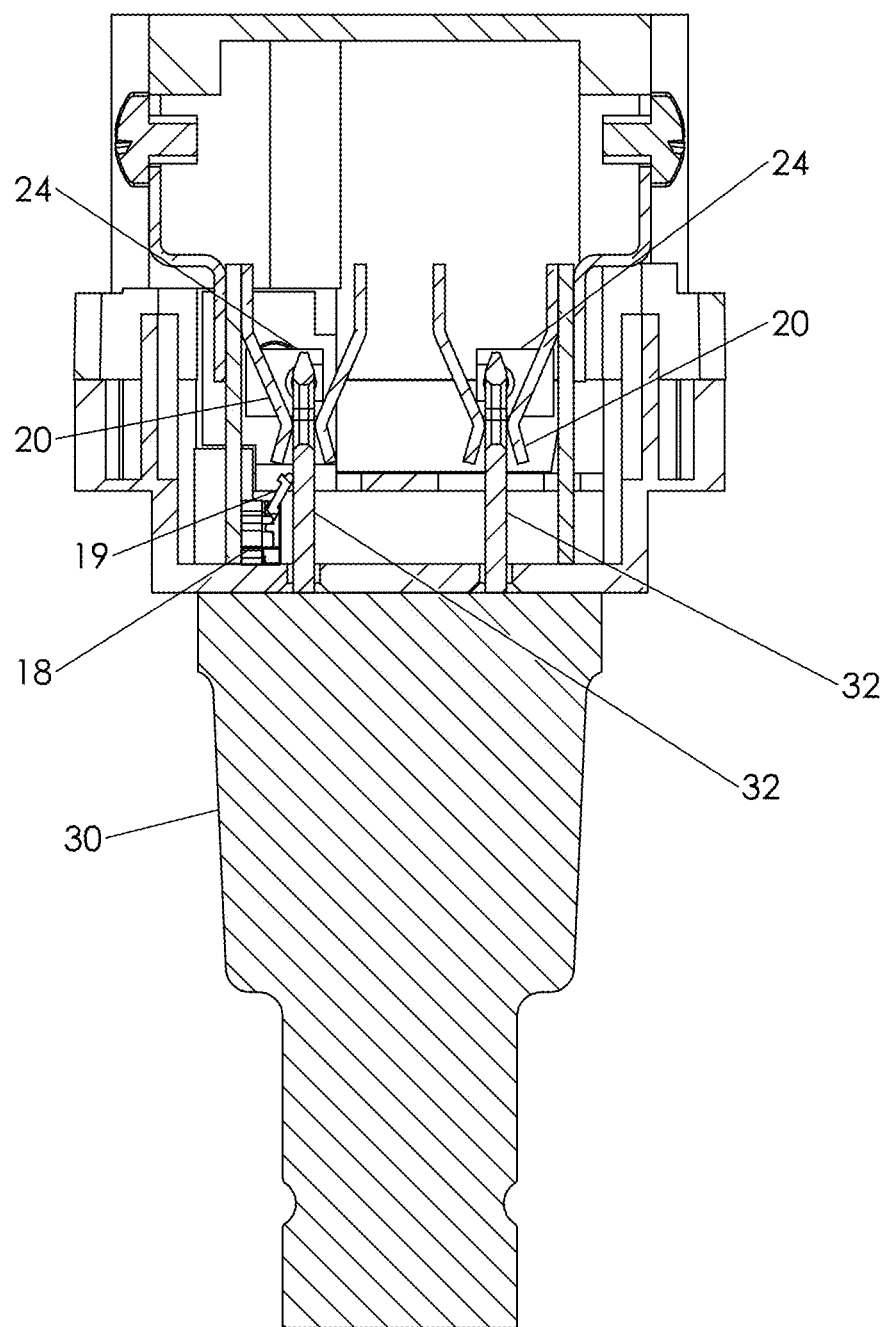
FIG. 1F is a section view taken from FIG. 1E.

FIG. 1D is a section view taken from FIG. 1C. FIG. 1E is a front view of receptacle 2, shown with plug prong blades 32, inserted in an outlet 6. FIG. 1F is a section view taken from FIG. 1E. Referring to FIG. 1D, as no object has been inserted in the socket, lever 19 has not moved to activate detector switch 18. The low voltage circuit portion to which the optical sensor connected thus does not provide power to emitter 22. Collector 24 does not produce output signals. No connection is made between terminals 13 and contacts 20.

Referring to FIG. 1F, detector switch 18 lever arm 19 has been tripped by blade 32 inserted in socket 8. Contacts 20 are sprung open by the application of force on blades 32 of plug 30. Power is applied to the low voltage circuit by virtue of tripped detector switch 18. The low voltage power remains applied when lever 19 is in the tripped position, i.e., whenever an object has been inserted in socket 8. Emitters 22 above each socket are active to produce light. Each collector produces an output signal when exposed to light produced by the corresponding emitter. As shown, collectors 24 beneath blades 32 do not produce output signals because the prong blades located in the path between emitters and collectors have blocked the light transmission.

In operation, when a plug or foreign object is inserted in the left socket 8 of outlet 6, lever 19 is moved to the tripped position before the inserted object makes contact with the socket contacts 20. During this time, power is applied to the low voltage circuit and to emitters 22 of the respective outlet 6. As object insertion has not yet reached contacts 20, each collector 24 receives emitted light and produces an output signal to the control circuitry. The control circuitry will not permit connection between power terminals 13 and contacts 20 of outlet 6 if a light output signal is received from either collector. As insertion of the plug advances to socket contacts 20, as depicted in FIG. 1F, emitted light from both emitters is blocked and no signal is produced by collectors 24.

The control circuitry is capable of determining the time difference, if any, between termination of light signals received from both collectors 24. If the time difference is determined to be near simultaneous, for example within twenty five milliseconds, the control circuitry will effect connection of contacts 20 to terminals 13. That is, simultaneous or near simultaneous sensing of insertion at both sockets is indicative of non-tampering. If a foreign object is attempted to be inserted into a socket, or if insertion of the plug cannot be completed to the contacts 20, collector output signals preclude connection of the contacts to the terminals 13. Connection of the sockets 6 of the receptacle are those controlled independently of each other.

Figure 2:
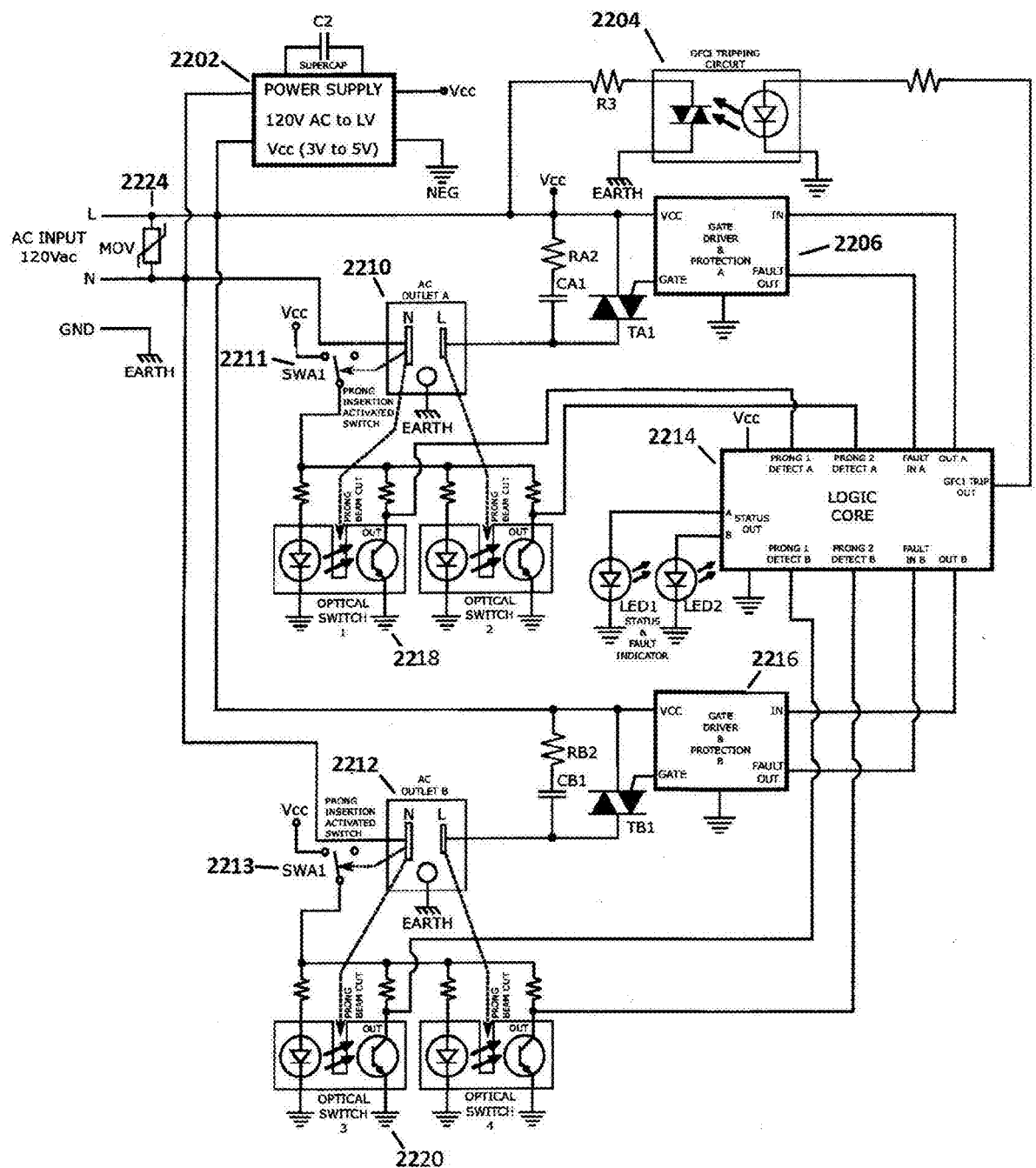
FIG. 2 is a circuit diagram for the example embodiment of FIG. 1A, utilizing GFI protection.

Referring to the circuit diagram of FIG. 2, an N contact of each outlet 2210 and 2212 of the receptacle is directly connected to the N (neutral) terminal of the alternating current source. The L contact of each outlet 2210 and 2212 is coupled to the L (hot) terminal of the alternating current source through a respective TRIAC. Metal oxide varistor (MOV) 2224 is connected across the L and N terminals to protect against overvoltage. Driver circuit 2206 is coupled to the control terminal of the TRIAC of outlet 2210. Driver circuit 2216 is coupled to the control terminal of the TRIAC of outlet 2212. Power supply 2202, connected across the L and N terminals, corresponds to power supply 18 of FIG. 1B. Optical sensor arrangement 2218 contains optical emitters and receivers that correspond to emitter 22 and 24 of FIG. 1B. Switch 2211, which corresponds to switch 19 of FIG. 1B, is connected between optical sensor arrangement 2218 and power supply 2202 when an object has been inserted into the socket of outlet 2210. Optical sensor arrangement 2220 contains optical emitters and receivers that correspond to emitter 22 and 24 of FIG. 1B. Switch 2213, which corresponds to switch 19 of FIG. 1B, is connected between optical sensor arrangement 2220 and power supply 2202 when an object has been inserted into the socket of outlet 2212.

Logic core 2214 (aka a processor) comprises inputs connected to receive signals output from optical sensors 2218 and 2220. Outputs of logic core processor are connected respectively to driver circuits 2206 and 2216. Outputs of processor 2214 are connected to LED1 and LED2 for energization thereof to indicate that objects have not been inserted in the respective plug sockets within a specified time. Processor 2214 is further connected to ground fault injector 2204 to generate a trip output for a current imbalance. The disclosed logic circuitry may include an AND gate or the like to receive signals from the optical sensors.

Figure 3:
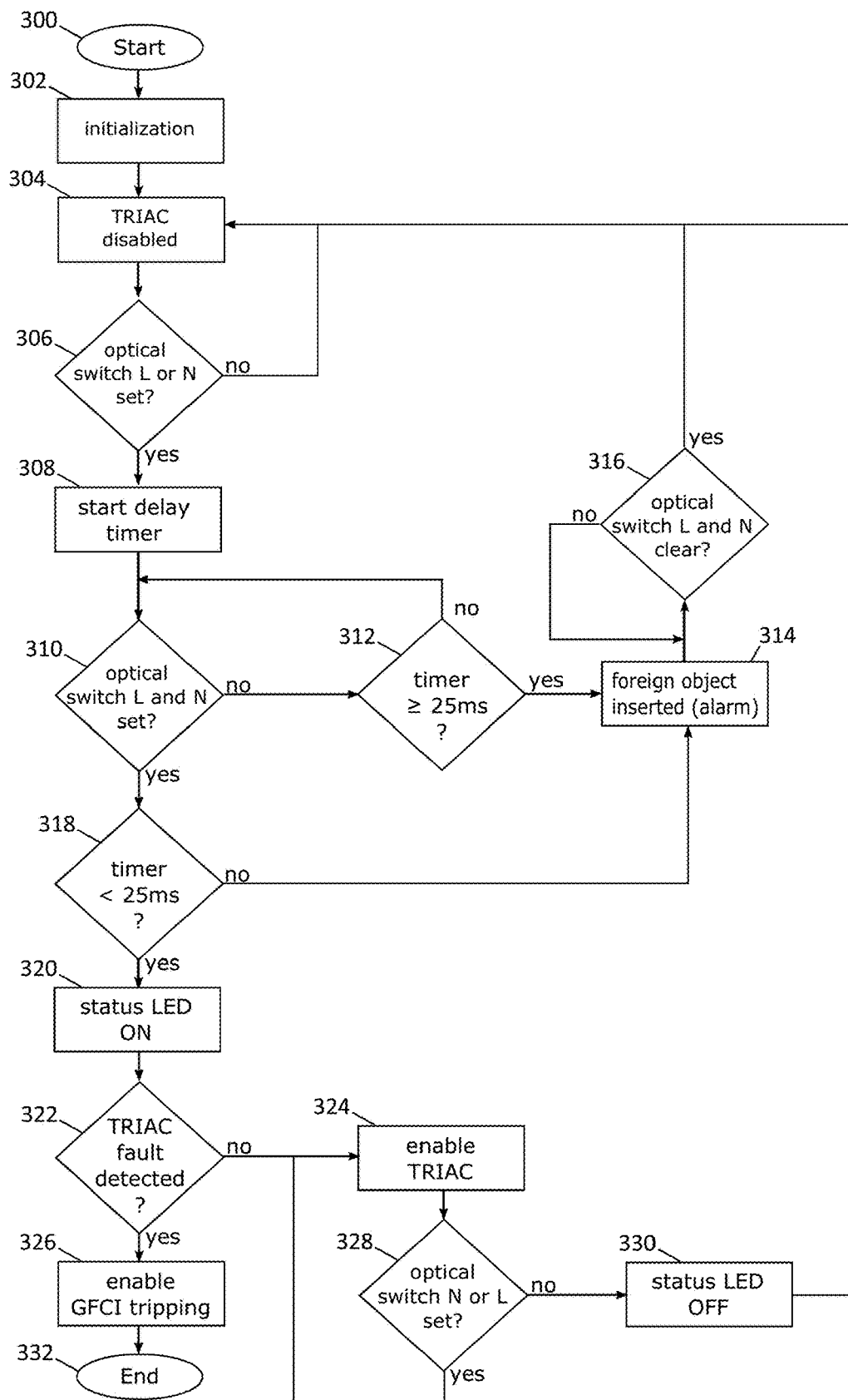
FIG. 3 is a flowchart for operation of the circuit of FIG. 2.

FIG. 3 is a flow chart of operation for the circuit of FIG. 2. At step 300, operation is started. Initialization proceeds at step 302 with power supply 2202 connected to the alternating current terminals. At step 304, there has been no activation of the TRIAC of a respective outlet. Step 306 is a decision block as to whether switch 2211 or 2213 has been tripped to supply power to the corresponding optical switches and whether the L or N socket optical switch has been initially set by blockage of emitted light. If so, a delay timer is started at step 308. Decision block 310 determines whether both L and N socket optical switches are set by blockage of emitted light. If the outcome of step 310 is positive, decision block 318 determines whether the positive output of step 310 has occurred within 25 ms. If the outcome of step 318 is positive, an ON status LED is activated at step 320. If there has been no fault detected at step 322, the respective TRIAC is activated at step 324 and activation thereof is continued as long as both L and N optical switches are set by emitted light blockage, as determined in step 328. A negative outcome of step 328 results in turning off the status LED at step 330 and flow reverts to step 304, in which the TRIAC is disabled.

If the outcome at step 310 is negative, the timer continues until it is determined that 25 ms has expired at step 312. A positive outcome of step 312 is indicative that a foreign object has been inserted in a respective socket to initiate an alarm in step 314. Decision block step 316 determines whether optical switches for both L and N sockets have cleared. When the outcome of step 316 is positive, flow reverts to step 304. The 25 ms delay period for TRIAC activation is intended to allow for slight variations in plug blade length within manufacturing tolerances or slight misalignment of the blades in the sockets during insertion, while not being long enough to permit connection to the power source by insertion of distinct foreign objects.

Figure 4:
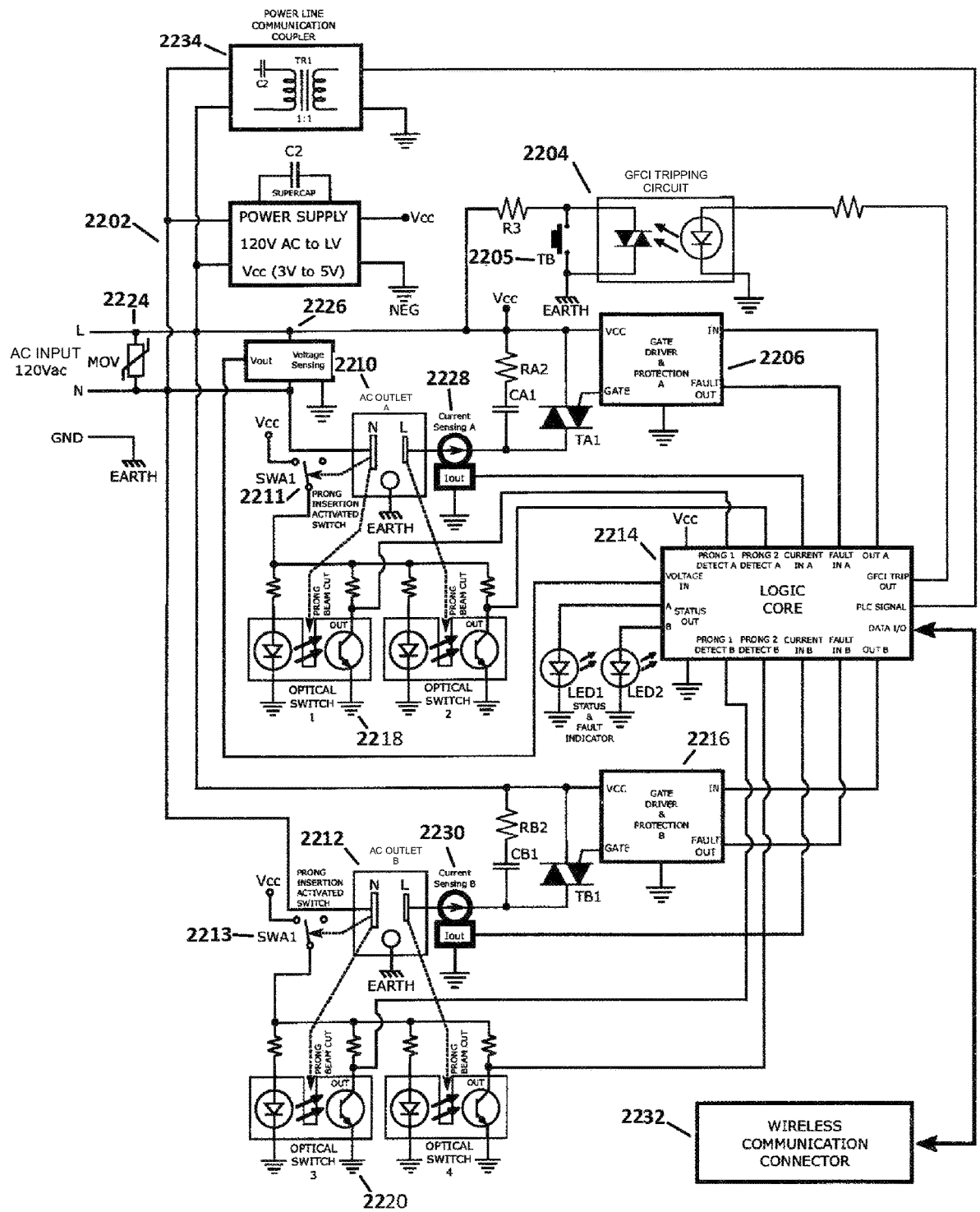
FIG. 4 is a more detailed circuit diagram of the example embodiment of FIG. 1A, including GFI tester and sensing, and communications module.

FIG. 4 is a more detailed circuit diagram, illustrating enhancements to FIG. 2, for operation of the embodiment of FIGS. 1A-1F. Current sensor 2228 is coupled to the hot line current path for the socket of outlet 2210. The output of current sensor 2227 is connected to an input of processor logic core 2214. Current sensor 2230 is coupled to the hot line current path for the socket outlet 2212. Wireless communication module 2232 is connected to a data input/output terminal of processor logic core 2214. Protocol for wireless communications may include Wifi, Zigbee or other protocols. Power line communications module 2234 is coupled between the alternating current source and a signal input of logic core 2214. Manual test button 2205 may be used for GFCI testing.

Figure 5A:
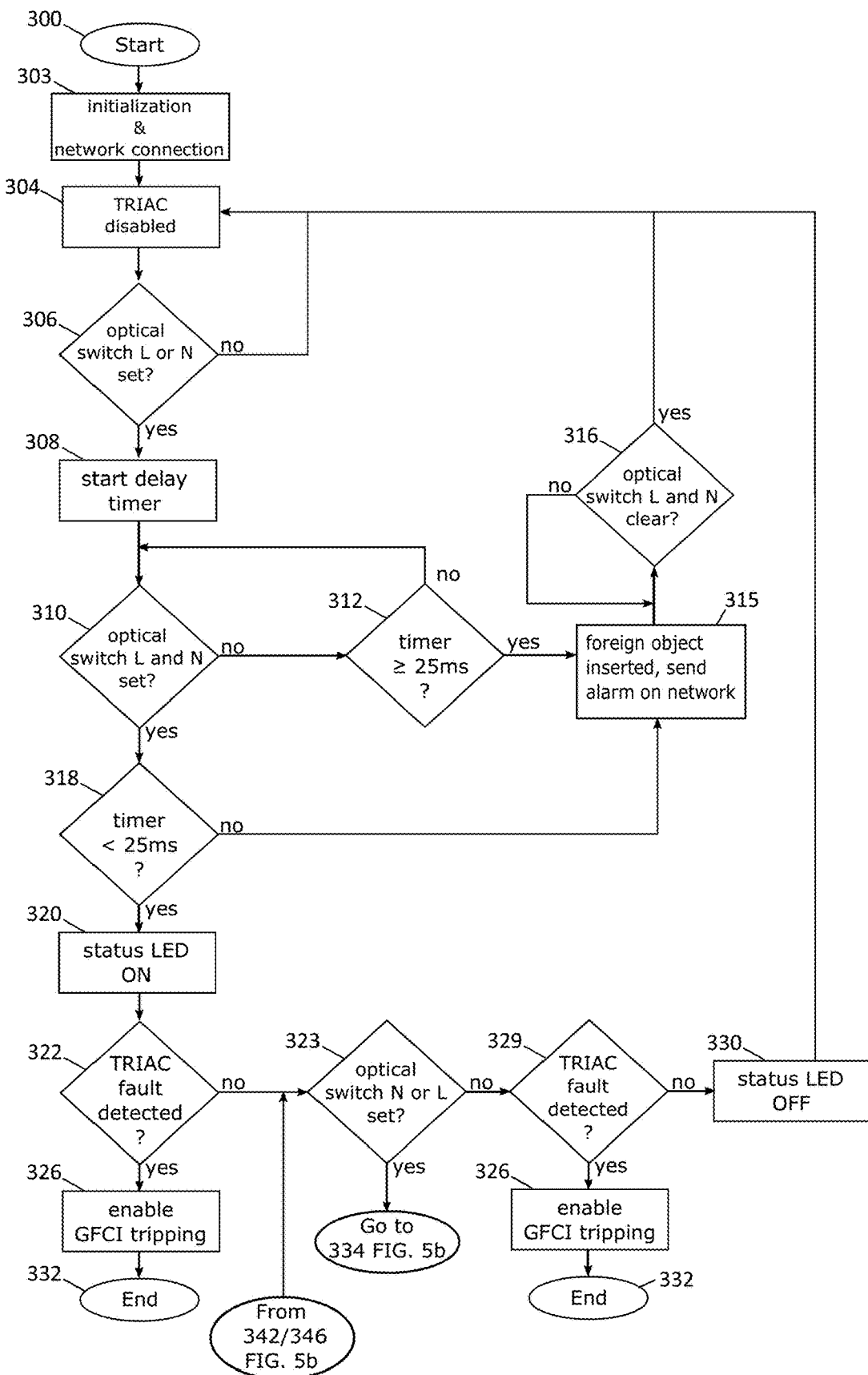
FIGS. 5A and 5B are a flowchart for operation of the circuit of FIG. 4.
Figure 5B:
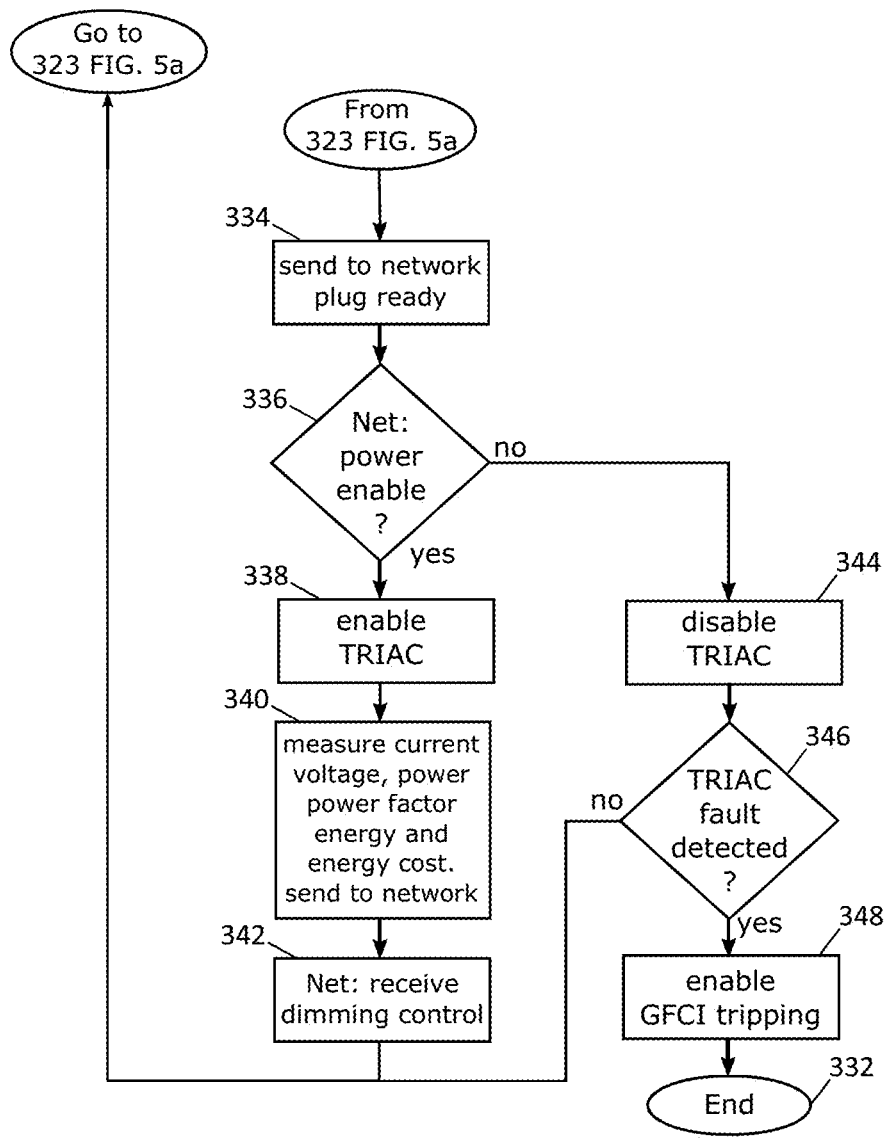

FIGS. 5A and 5B together form a flow chart for operation of the circuit of FIG. 4. Elements of FIGS. 5A and 5B that are in common with those of FIG. 3 contain the same reference numerals and the description thereof can be referred to the description of FIG. 3. FIG. 5A differs from FIG. 3 in the respect that the decision branch from decision block 322 has changed from step 324 and expanded to decision blocks 323 and 329. Steps are provided for related communications beginning at step 334. At step 334 communication is sent to the network that the plug has been successfully inserted. Decision block 336 establishes whether the network power should be enabled. If so, steps 338, 340 and 342 are processes related to power measurement and dimming. If not, steps 344, 346 and 348 deal with disabling the Triac and any resulting Triac faults (decision block 346). Upon a fault detection, GFI tripping is enabled in step 348.

Figure 6B:
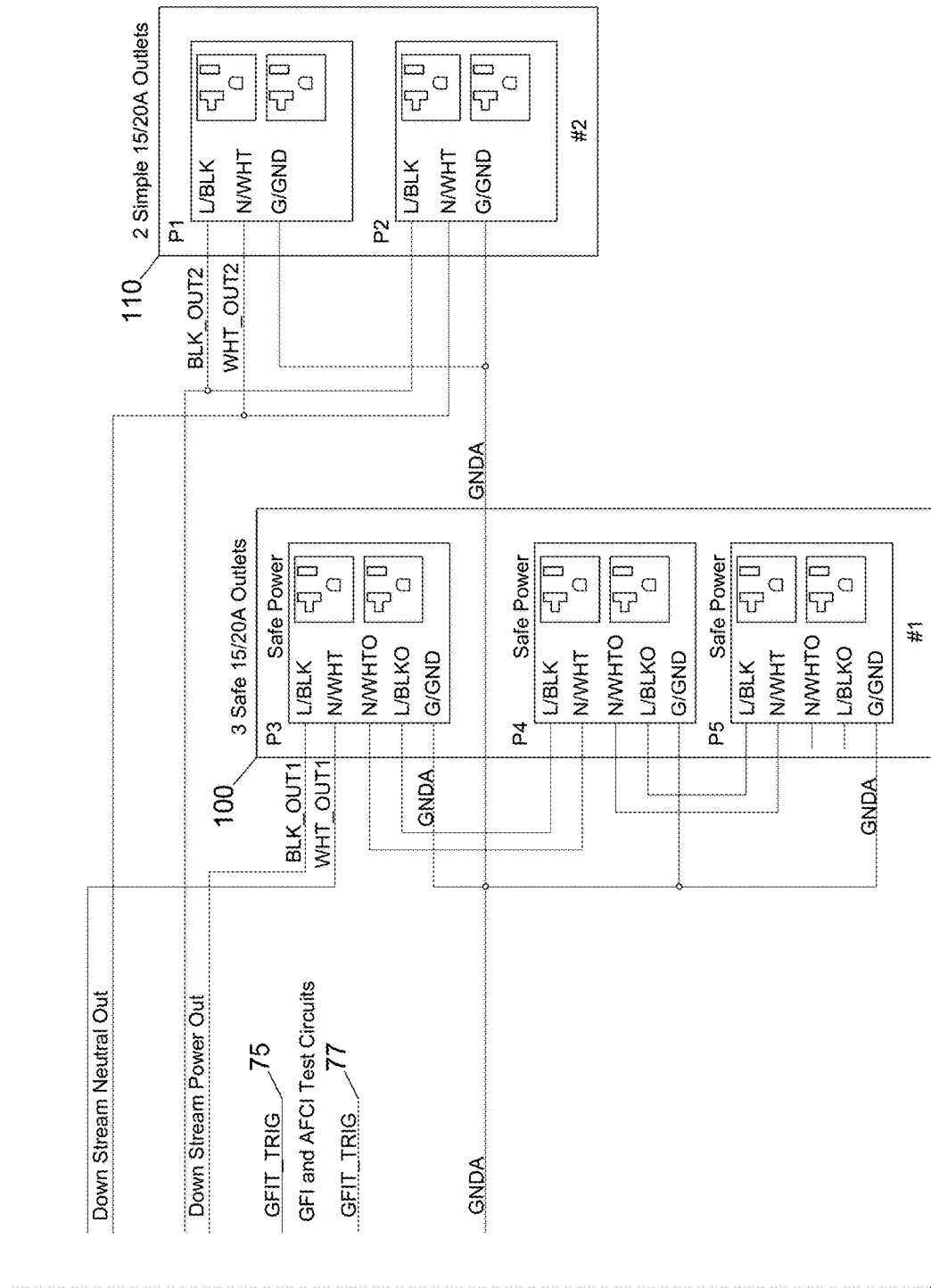
Figure 7A:
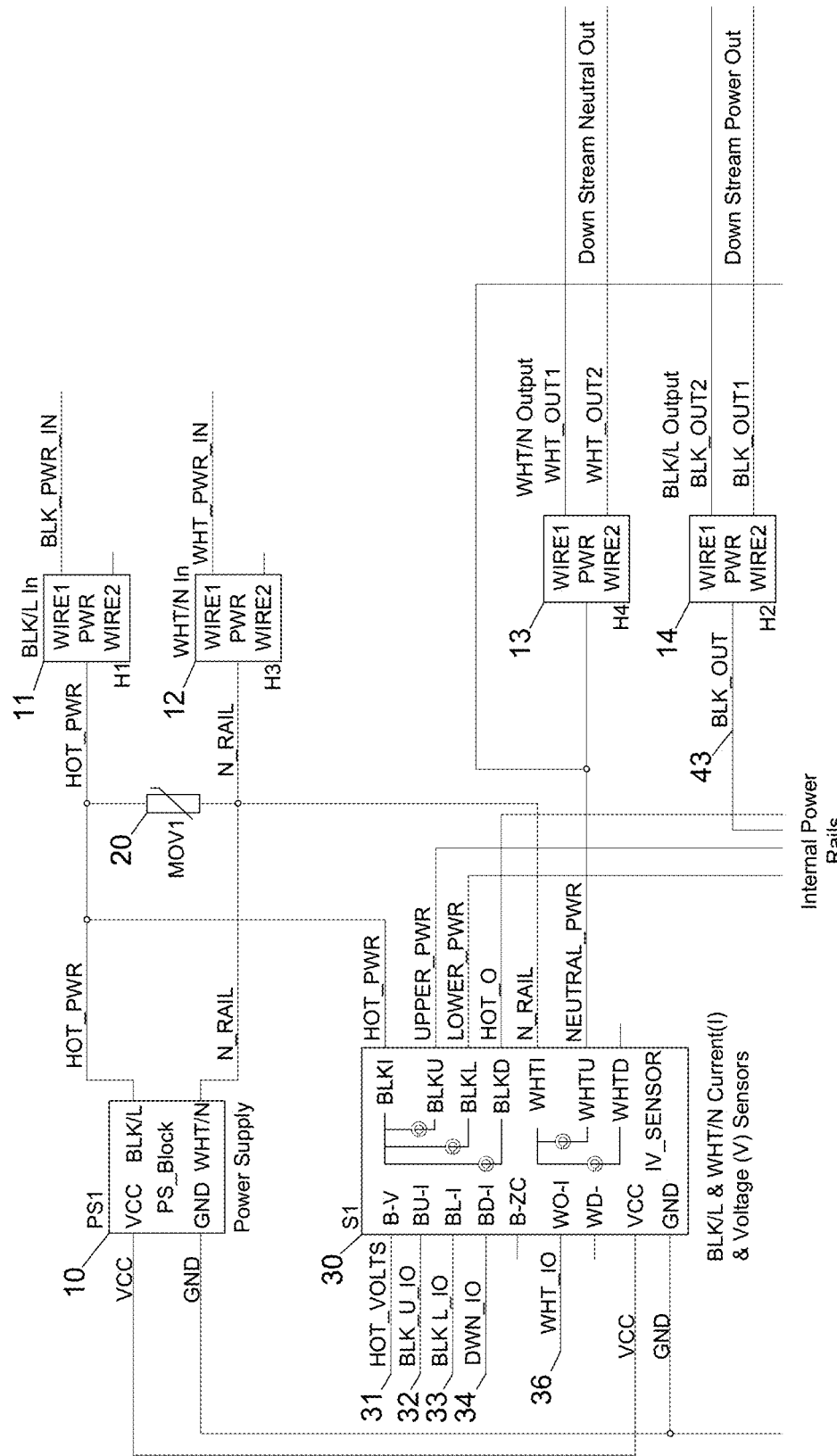
Figure 7C:
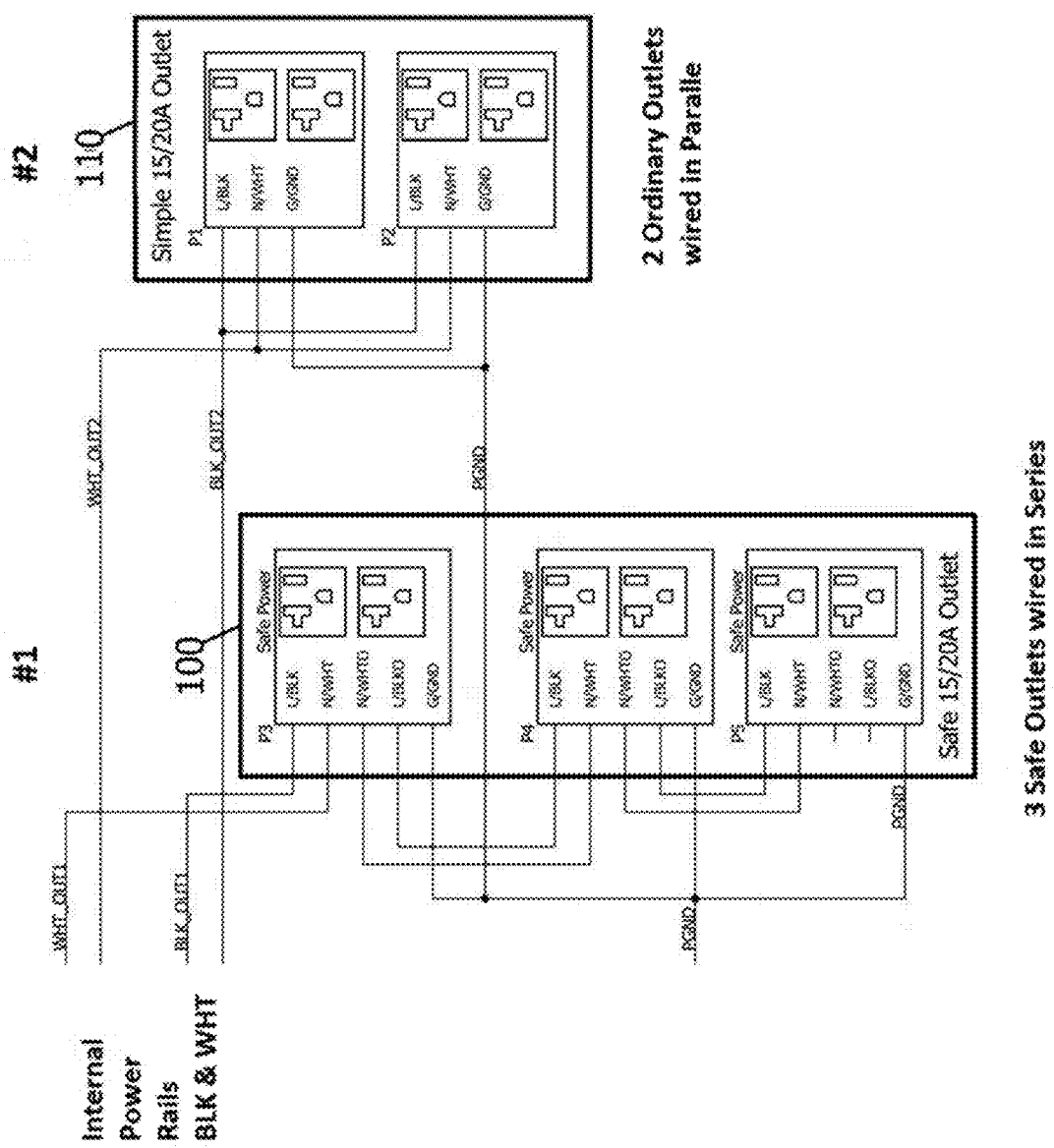

FIGS. 6A-A, 6A-B and 6B are a more detailed circuit representation of FIGS. 2 and 4, including a plurality of receptacles in a system for protection against AFCI, GFCI and surge faults. For ease of clarity, FIGS. 6A-A, 6A-B and 6B is divided into three sections, reproduced in FIGS. 7A-7C. Referring to FIG. 7A, power input lines are connected to hot power terminal 11 and neutral power terminal 12. MOV 20 is connected across the hot power and neutral power lines to protect against overvoltage. Power supply block 10, fed from the hot and neutral power lines, provides low voltage power to the processor logic circuitry. The processor circuit may comprise a microcontroller 80, shown in detail in FIG. 8. Microcontroller 80 may contain a broadband noise filter routine such as fast Fourier transform.

The output of power supply block 10 is coupled to current and voltage sensors block 30, and TRIAC drive blocks 40, 50 and 60 of the processor circuit. Block 30 may represent a plurality of sensors, which are not shown here for clarity of description. Blocks 50 and 60 are illustrated in FIGS. 7B-A, 7B-B. Activation of TRIAC 43 by drive block 40 connects hot and neutral line power to terminals 13 and 14, which connect to three series outlets 100 and two parallel outlets that are downstream, shown in FIG. 7C. Activation of TRIAC 53 by drive block 50 connects the hot line to upper outlet 54, shown in FIGS. 7B-A, 7B-B. Activation of TRIAC 63 by drive block 60 connects the hot line to lower outlet 64. GFI test push button switch SW1 and reset push button switch SW2 are connected between the output of supply block 10 and the processor circuit. GFI and AFCI test circuits 74 and 76 receive outputs 75 and 77, respectively, as shown in FIGS. 7B-A, 7B-B, from the microcontroller 80, shown in FIG. 8. All inputs and outputs shown in FIGS. 7A-7C relate to the respective terminals of similar references in the processor of FIG. 8.

Each outlet 54, 64 of the receptacle has tamper resistance that restricts energizing of the sprung contacts until the blades of an electrical plug are completely inserted into the receptacle. Multiple sensor inputs 55, 56, 57, 58, 65, 66, 67, 68 for the plug blades of outlets 54 and 64 are shown in FIGS. 7B-A, 7B-B. The sensors sense the arrival of the blades. If the arrivals are within a specified period of time, the outlet will be energized. The device will only turn ON power to the particular outlet, when it detects that the two power plug pin detection circuits have detected that the BLK & WHT plug pins have been inserted. The circuits provide a logic signal which operates as an interrupt to the microcontroller, so it will turn ON or OFF the TRIAC driver circuit (logic Output signal) 41, 51, 61. There is also a respective TRIAC fault signal 42, 52, 62 which is provided for each power TRIAC.

Upstream series arc faults can be detected by monitoring voltage 31. During a series arc fault the voltage on the conductor tends to be erratic and does not follow sine wave attributes. By monitoring current 30 on the hot and neutral conductors and comparing it to the ground conductor, the presence of an arc fault is detected and the severity of the arc fault is reduced by disabling the receptacle outlets 54, 64 and/or the downstream loads 14 to minimize current flow. Different arc fault types have different timing profiles. The logic processing can compare sensed data to reference data that can be stored in a table.

As noted above, FIG. 8 sets forth in detail the input and output pins of the microcontroller 80. Included in the receptacle with microcontroller 80 is communication module 90. Communication terminals 91 and 92 are connected to corresponding pins of microcontroller 80. The antenna provides communication with circuit receptacles to allow monitoring of the current draw of the circuit. Information from monitored voltage and current can be analyzed, accessed, reported and/or acted upon. Power to and from any outlet can be turned on and/or off by external commands to the communications module. A buffer interface, not shown, can be added to communications lines 91 and 92. Data from microcontroller 80 can be collected by an external software application to provide external controls such as dimming, turning power on/off, controlling power outputs, or for obtaining information on power outputs.

Figure 9:
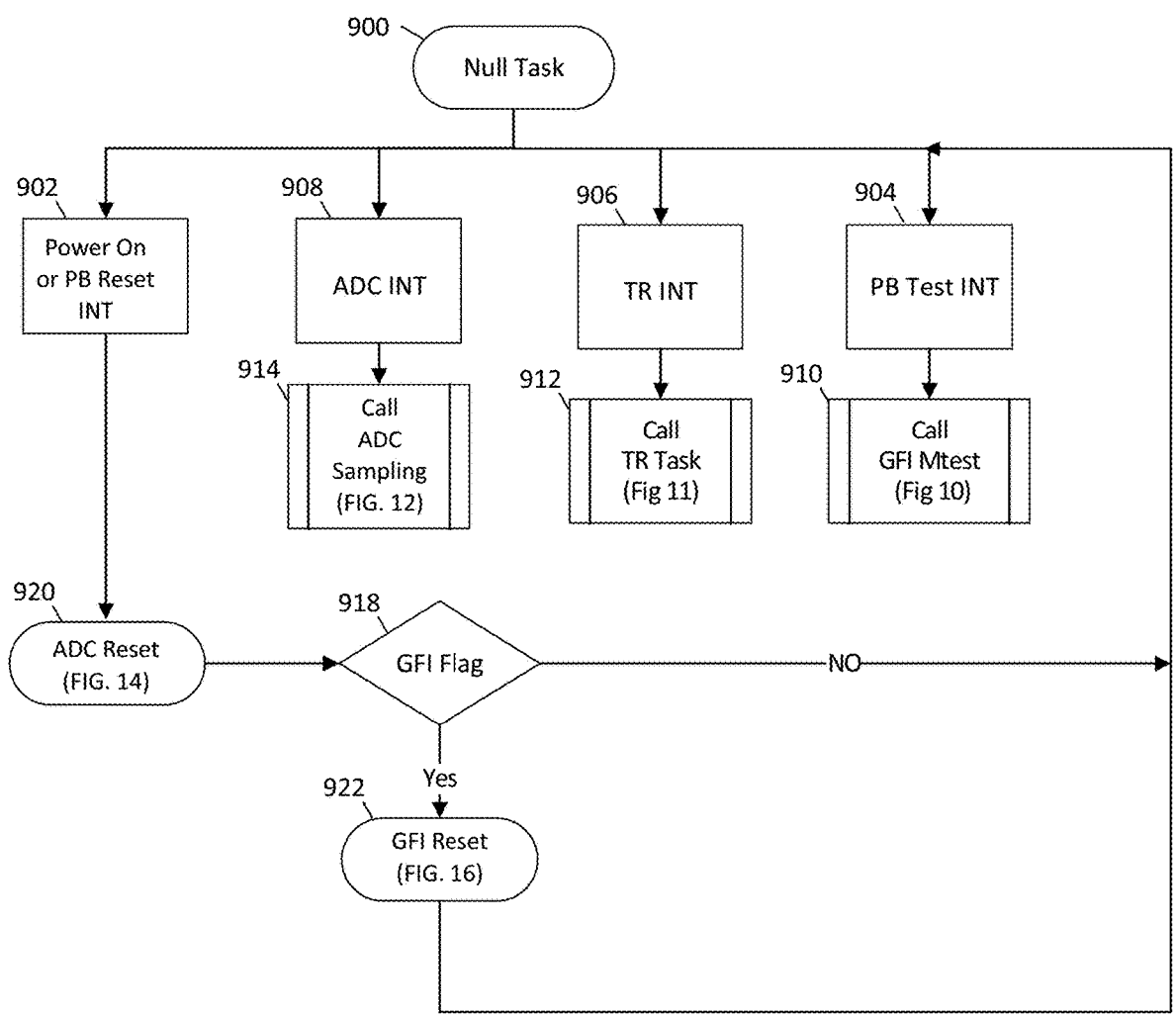
FIG. 9 is a flowchart for operation of the processor of FIG. 8.

FIG. 9 is a flowchart of null task process 900 routines implemented by processor 80. Signals to processor 80 generate interrupts in accordance multi-interrupt structure 902, 904, 906, and 908. Any of received reset interrupt signal 902, push button test interrupt signal 904, tamper resistant related interrupt signal 906, and a-d converter (ADC) interrupt signal 908 triggers an interrupt for execution of the appropriate subsequent routine.

Interrupt 902, caused by a push button activated fault or by a requirement for a reset, such as need for a power up/startup, triggers step 920 to activate the ADC Initialization process. Subsequently, if step 918 determines that the GFI flag is set, then step 922 initiates GFI process steps depicted in FIG. 16, to reset and/or initialize GFI hardware. Tamper related interrupt 906, triggers step 912. Testing of Tamper Resistance is determined by sensing pins and responding to ADC interrupts. The process for 912 is depicted in FIG. 11. Analog to Digital Conversion (ADC) interrupt 908, indicating that the ADC completed a conversion of one of the analog voltages, triggers ADC sampling process 914, depicted in FIG. 12. PB Test Interrupt 904 initiates the GFI Manual test step routine 910 depicted in FIG. 10.

Figure 10:
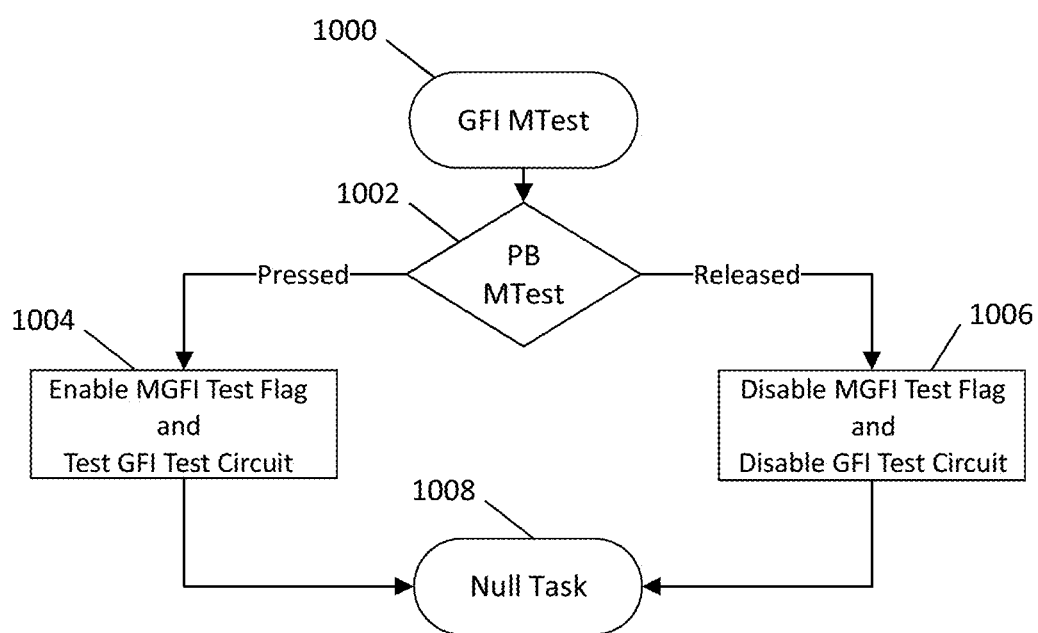
FIG. 10 is a GFI manual test flowchart for operation of the processor of FIG. 8.
Figure 11:
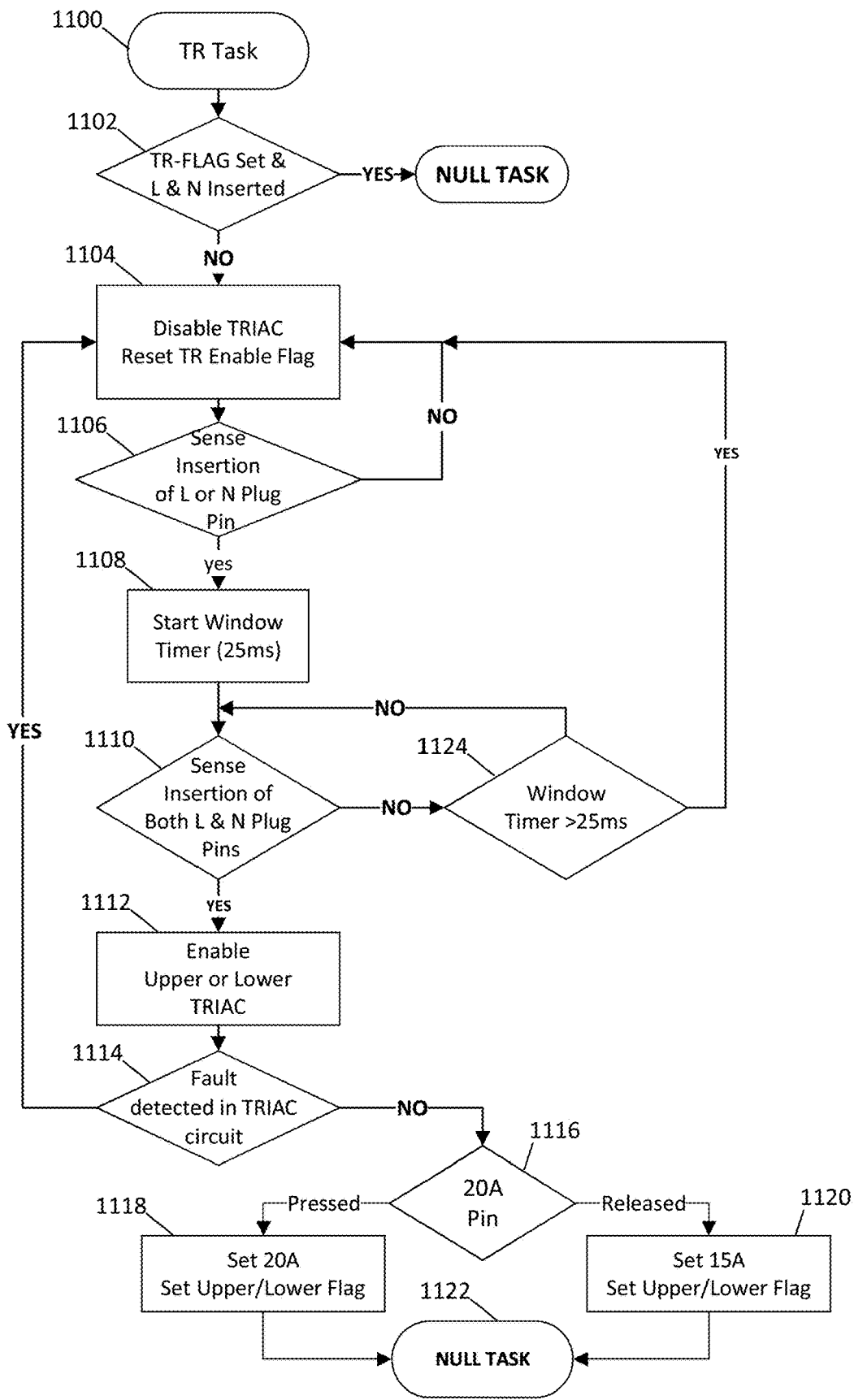
FIG. 11 is a processing task flowchart for tamper resistance blade detection circuitry of FIGS. 6-8.

The flow chart of FIG. 10 relates to a manual GFI test 1000. Test Circuit is represented as block 76 in FIGS. 7B-A, 7B-B. Step 1002 determines whether the test push button (PB) is pressed or released. Step 1004 sets the manual test flag ("enabled") and tests the GFI test circuit if PB has been pressed. Step 1006 disables the manual test flag and the GFI test circuit, respectively, if PB is released. This process illustrated can also be applicable to a manual push button test for GFI other faults including but not limited to AFCI. The enabling of the MGFI test flag is to trigger a priority interrupt during the next logical processing step.

FIG. 11 is a flowchart that is common for both the upper and lower outlets for detecting the insertion and removal of plug pins. Block 110 starts the tamper resistant function. Step 1102 verifies that TR processing is being done as indicated by the TR flag having been set. If the line (L) and neutral (N) pins are already inserted, the process returns to the Null Task polling routine 900 in FIG. 9. If the L and N pins have not been inserted, then the process continues to step 1104. As the triac should be off unless both L and N pins are detected to have been inserted each within a predetermined window timer (25 ms in this example), the triac is disabled. At step 1106, determination is made of whether an L or N plug prong is inserted. If so, the window timer at step starts at step 1108. If decision block 1110 determines whether both L and N plug prongs have been inserted in an upper or lower outlet in a receptacle within the acceptable 25 ms time frame, then step 1112 enables the Upper or Lower Triac for the "upper outlet" or for the "lower outlet" respectively. If not, step 1124 has determined that insertion of both prongs has not occurred within the 25 ms timeframe, and flow reverts to step 1104 to disable the triac.

The decision block at step 1114 determines whether a fault is detected in the triac circuit. If not, decision block at step 1116 determines whether a 20 amp or 15 amp pin has been inserted in the outlet. Depending on whether or not a 20 A Pin has been pressed or released, step 1118 will set 20 A or step 1120 will set 15 A as the maximum current.

If step 1124 determines that both pins aren't inserted within the required 25 ms timer parameter, then the process continues to step 1104 to disable the Triac. If a fault has been determined in step 1114, the process returns to step 1104 where the Triac is disabled.

Figure 12:
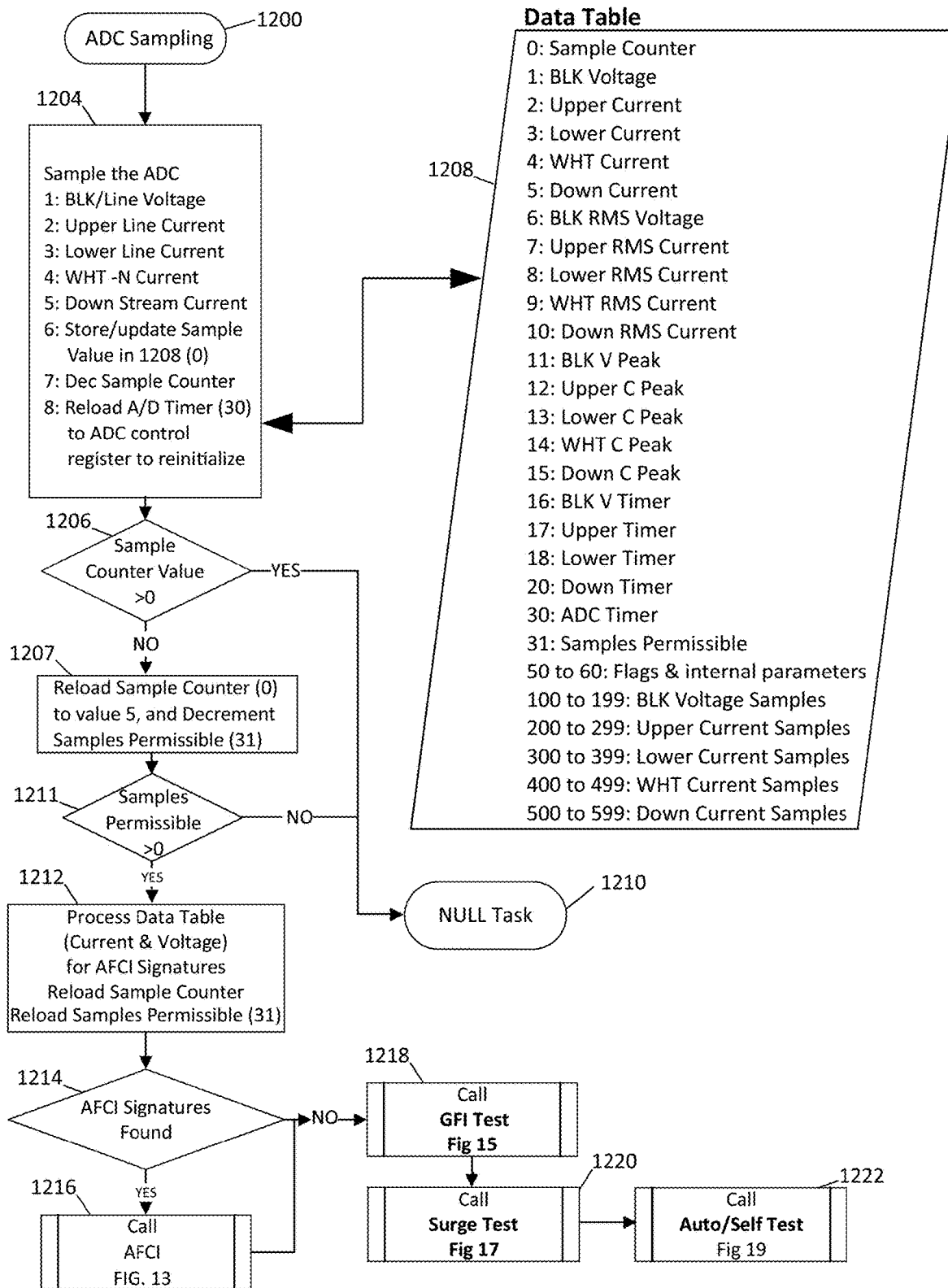
FIG. 12 is a sampling flowchart for the ADC circuitry of FIGS. 6A-A, 6A-B, 6B, 7A, 7B-A, 7B-B, 7C and 8.

FIG. 12 is the flowchart of the AFCI sampling process 1200 which takes place as a result of receiving an Analog to Digital Converter Interrupt 908 in FIG. 9 indicating the presence of a new analog value, which interrupt calls this sampling routine 1200 from block 914.

Once values of voltage and current (1-5 in block 1204) have been sampled, stored in the Data Table 1208 and a sufficient preset number (Samples Permissible Counter 31 in Data Table) of samples have been accumulated (steps 1204, 1206, 1207 and 1211), then values in the Data Table are processed according to the actions in block 1212 to be used for other purposes such as fault testing.

For each new analog value, the tasks in block 1204 are executed: establishing which line (1-5) was sampled; i.e. the Black/Line Voltage (1), the current of the upper outlet (2), the current of the lower outlet (3), the White/Neutral Current (4) and the downstream current (5). Upon receipt of one value for any of 1-5, the sample counter value (preset in this embodiment to the value 5) is stored (block 1204, step 6) in Data Table block 1208 (0) which value gets updated. This sample counter is then decremented (step 7) in order to read the next value (1-5) retrieved from MUX which is set to next logical input. Step 8 in block 1204 then reloads the value of the ADC ("A/D") Timer found in Data Table block 1208 (30) to the ADC control register to reinitialize. The MUX is an analog multiplexor which selects for the ADC one of the 8 permissible analog inputs (in this embodiment, only 5 are used for analog signals).

One ADC generates one value based on the MUX selecting the next of one of the 5 analog inputs signal values to be processed, reloading the timing register in the processor which is for the Analog Digital conversion. A/D sample Timer (30) in the Date Table 1208 is the number of processor clock cycles to wait (e.g. 16) before the processor's ADC generates the next analog value to be stored. As it is ADC hardware dependent, the 16 clock cycles could be a different value for another processor. Decision block 1206 tests to see if the sampling processes in block 1204 have been repeated five times to acquire the five analog measurements (1-5 in block 1204), based on the Sample Counter being decremented (7, block 1204) from five to zero.

Data Table 1208 builds values in locations 1-5 from the sample values 1-5 obtained in block 1204 and is stored in the Data Table based on the sample counter (0).

During the process 1204, the Sample Counter which is decremented ranges from 1 to 5, and is used as a pointer in the Data Table 1208, being an index indicating which of the 100 to 500 arrays to use.

Decision block 1206 determines that if the Sample Counter has not decremented down to zero, then the process returns to null task FIG. 9 waiting for next ADC interrupt signal.

Once the counter has decremented to 0, sampling will repeat until sufficient samples have been collected based on the value in Samples Permissible 31, Data Table 1208.

For example, in this embodiment, as 99 sample values are being accumulated for each of the 1-5 power signals, then 99 sample values of the Black Voltage these would be stored in the Data Table as 101 to 199; 99 sample current values for the upper outlet in 201-299; 99 sample values for the lower outlet, in 301 to 399; 99 sample values for the White Current, in 401-499; and 99 sample values for Downstream Current, in 501-599.

The steps in block 1207 and the decision block 1211 cause the sampling of the 5 signal values to take place for 99 times to be used to determine AFCI signature, and to calculate averages (RMS) for example. Decision block 1211 using the changing value in 31 of Data Table 1208, determines if the value in the Samples Permissible Counter (31) has been decremented from 99 to 0.

In an embodiment, in FIG. 12 ADC values are read from the ADC register and stored in data sets and then the data is processed. In this embodiment 99 values have been used for each of the five power types, as being sufficient to represent the sine wave signature. The sample values (100-599) are used after processing to detect spikes, etc. occurring in the values in the Table.

At block 1212, there now are a full set of values within each of the 5 arrays 100, 200, 300, 400 and 500.

From the samples collected in each of 100, 200, 300, 400 and 500 series, peaks can be calculated (11, 12, 13, 14, and 15), as well as averages (6, 7, 8, 9 and 10).

Subsequent to processing steps in block 1212, four types of tests are performed; namely, AFCI (1214, 1216), GFI (1218), Surge (1220) and Auto/Self (1222). However, in another embodiment, the data sampled could also be processed for Peak Values (11-15 in the Data Table 1208), power spikes could be tested for; similarly RMS (average) values could be used to monitor, test and disable power for brownout and/or other conditions.

Following the processing of the Data Table 1208 and establishment of an AFCI signature in 1212, the signature block 1214 tests for the presence of an AFCI Signature. If AFCI signature is found it continues to step 1216 to process AFCI tasks on FIG. 13.

FFT (Fast Fourier Transform) is a possible method of extracting frequencies out of a Data Table. The FFT is looking at the values in 100-599.

The detection of spikes indicates that there is arcing; i.e. high frequency pulses. FFT finds the frequency that is indicative of the arcing, then values are checked for duration and amplitude. If decision table 1214 does not find an AFCI signature, the process continues to block 1218 to determine if GFI fault conditions exist. Subsequently the process continues testing for Surge 1220 and then Auto/Self Test 1222.

Other tests could be incorporated, for example, for overvoltage and brownouts. Similar to GFI and Surge, all the raw data required exists in the Data Table 1208.

Figure 13:
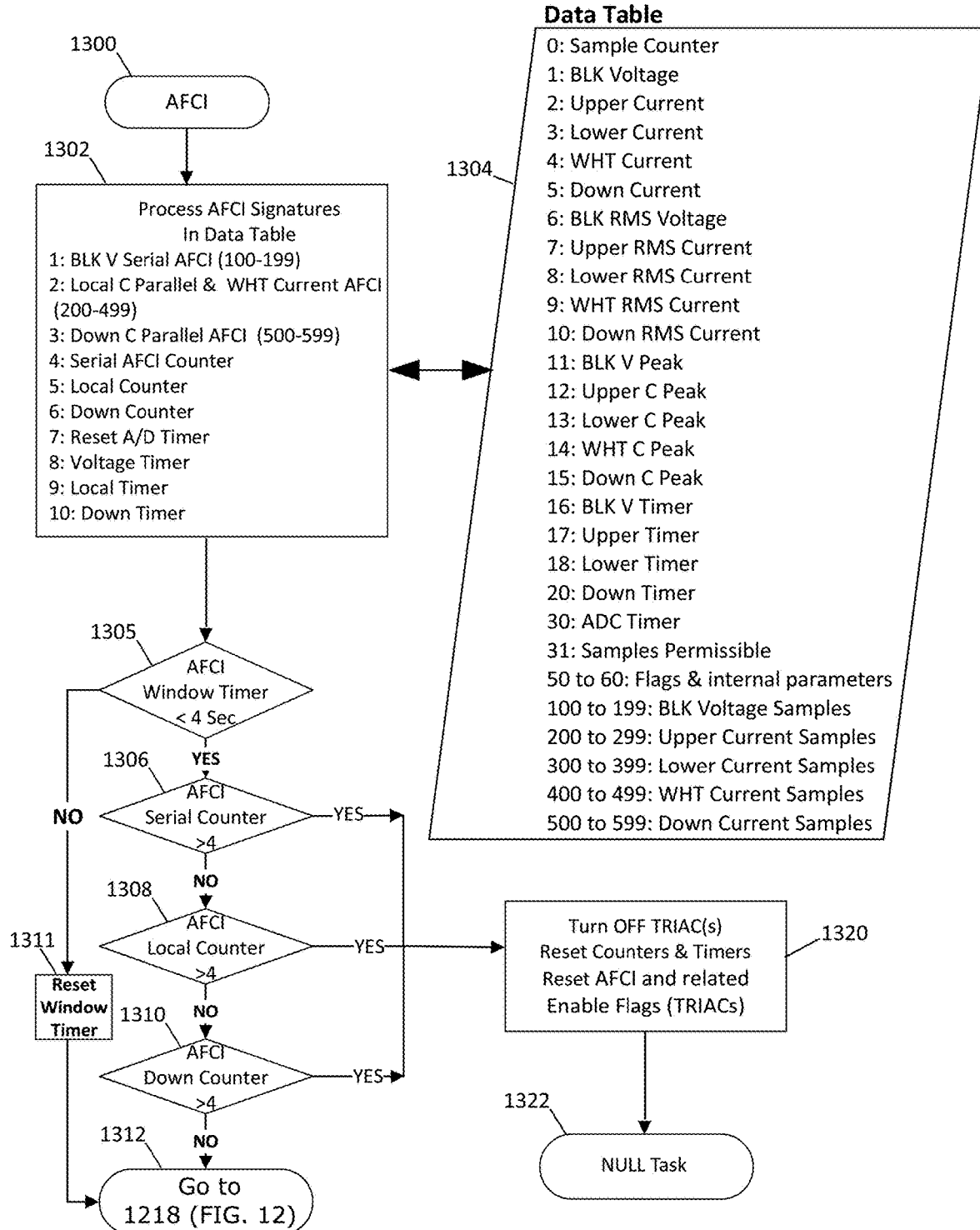
FIG. 13 is an AFCI flowchart for the circuits of FIGS. 6A-A, 6A-B, 6B, 7A, 7B-A, 7B-B, 7C and 8.

Referring to the flowchart of FIG. 13, block 1300 starts processes for AFCI signatures and establishes whether and where there may be an AFCI fault requiring power to be shut off. Various types of processing activities for various types of AFCI interrupts which can take place due to voltage faults on the Black line in series, and/or current faults due to faults on the local outlet or downstream. These are listed in block 1302.

In Block 1302, Black Voltage signals are processed as these can signal Serial AFCI ("BLK V Serial AFCI") conditions. Current on the white ("WHT") for the local and for the downstream is processed for parallel AFCI fault signals. Block 1302 also references Serial, Local and Downstream ("Down") preset counters for the Black Voltage Serial (4), Local (outlet) Current Parallel (5) and Downstream Current (6) AFCI conditions. In addition to event counters, there are timers for each of the three conditions (8, 9, 10). In this embodiment, both conditions of minimum number of events and maximum timing must be met to turn off the Triac(s) at block 1320. The counters are used to minimize false triggers (e.g. an acceptable motor startup) of a non-AFCI condition provided the flag occurred a certain number of times and within a short time window such as 4 seconds for the series, local and downstream timers (decision block 1305) indicating a valid AFCI condition requiring turning off of the power.

The Data Table 1304 in FIG. 13 is the same as table 1208 shown in FIG. 12, as the values are re-used for different conditions. If an AFCI fault has been detected at steps 1306, 1308, 1310 then the processes in Block 1320 cause the Triac(s) to be turned off, cutting power at the local outlet and downstream. Counters, timers, AFCI and related flags (eg Triacs) are reset. Process continues to Null Task.

In an alternative, it is possible to shut off power the power only to the local outlet or receptacle could be shut off, and not to devices further downstream.

Figure 14:
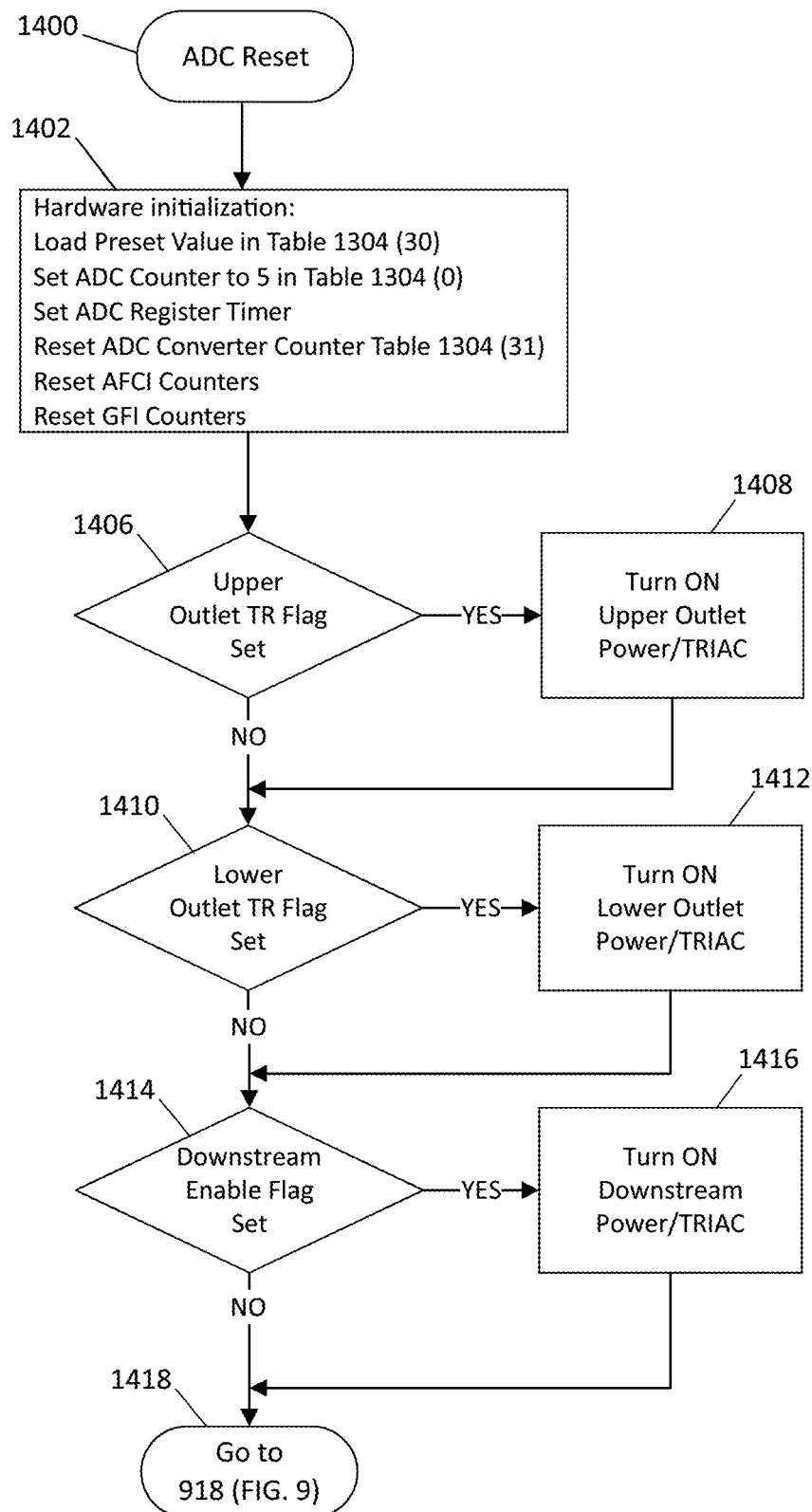
FIG. 14 an ADC reset process flowchart for the circuits of FIGS. 6A-A, 6A-B, 6B, 7A, 7B-A, 7B-B, 7C and 8.

FIG. 14 is a flowchart of the ADC reset process. Interrupt 902 (FIG. 9) signals a manual power reset or power startup condition requiring an ADC reset action for hardware and power initialization tasks to be executed. Block 1402 initializes and resets certain counters and values:

Preset value (e.g. 16), representing the clock cycle, is loaded in 30, Table 1304 Value of 16 is specific to particular ADC hardware; ADC Converter counter is set to the value 5 in Table 1304(0); ADC Register Timer is set by storing the value in Table 1304(30) in the ADC Register Timer; ADC Converter Samples Permissible Counter in Table 1304(31) is reset to 99; AFCI Counters and GFI Counters are reset.

Although other processes may turn on the power Triac(s) independently of a TR testing requirement, in process 1400, Triacs are not turned on at steps 1408, 1412 and 1416 unless the TR function requirement has been met by decision box steps 1406, 1410 and 1414. Steps 1406, 1410 and 1414 turn on the appropriate power Triac(s), depending on whether the Upper Outlet, Lower Outlet and/or Downstream flags have been set.

If 1406 indicates that there is nothing wrong in the upper outlet, the Upper Outlet is turned on at step 1408. If step 1410 indicates determines that the Lower Outlet flag is set, indicating that there is nothing wrong with the Lower Outlet, then the Lower Outlet Power/Triac is turned on at step 1412. If step 1414 verifies that the Downstream power feature is active (i.e.) the enable flag has been set, the Downstream is made available for processing by turning ON the Downstream Power/Triac at step 1416. Turn on (or off) of the Power/Triac for downstream is made for the entire receptacle, although this action could be restricted to one or both of the outlets in the receptacle only.

Figure 15:
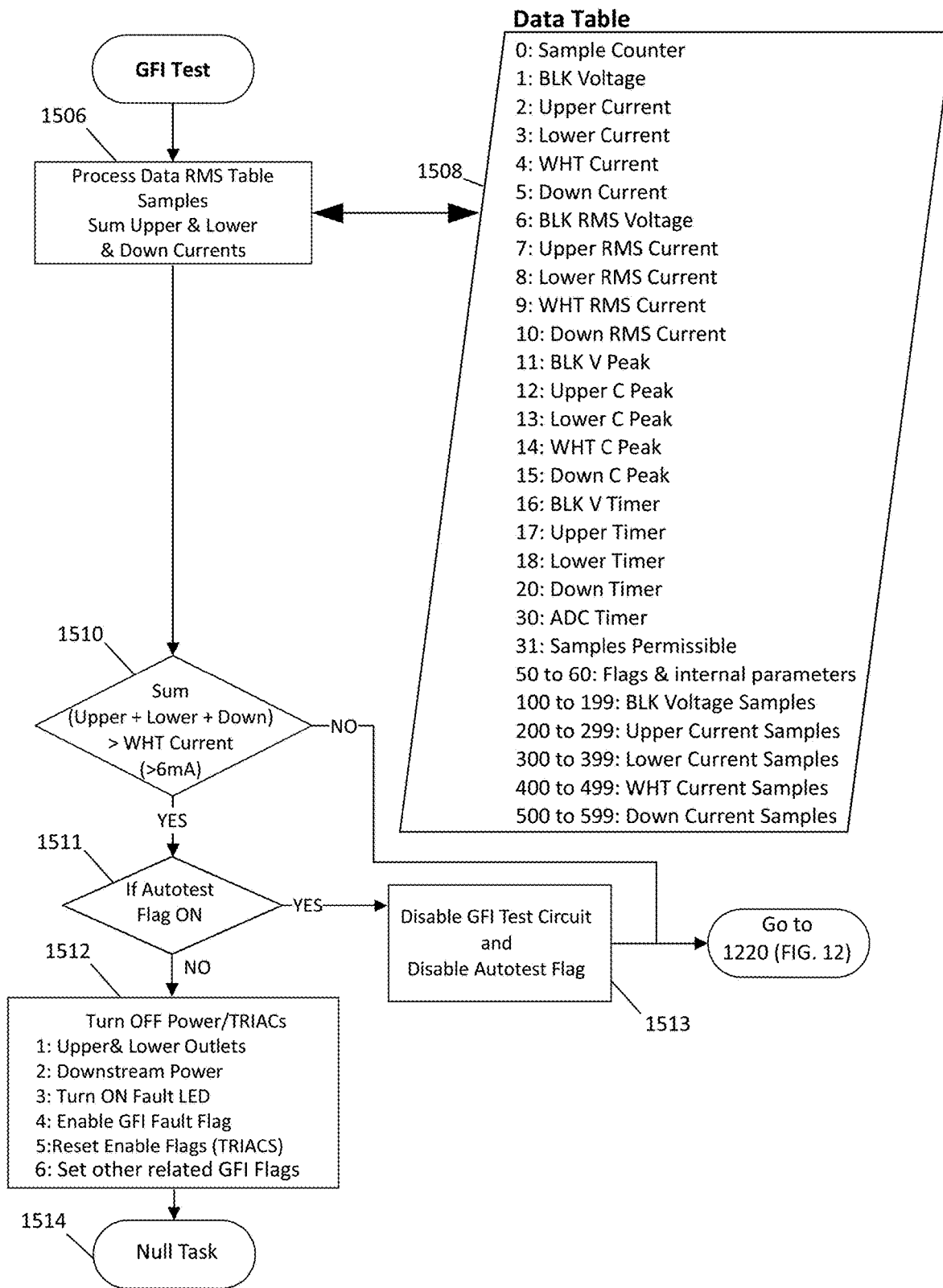
FIG. 15 is an GFI Test flowchart for the circuits of FIGS. 6A-A, 6A-B, 6B, 7A, 7B-A, 7B-B, 7C and 8.

FIG. 15 is GFI test flowchart, in contrast to AFCI which works on signatures (block 1214, FIG. 12). GFCI processing works on sample values, RMS values and durations, applying data table 1508, elements 5-20. For example, the RMS (average) values are used for the Black ("BLK") 7, 8 and 10 which is for power in and out; the White ("WHT") 9 represents all return currents. As noted previously, the various data tables 1208, 1304, 1508 and the table of FIG. 18 represent the same processor memory storage. For example, creation of the data table 1508 has occurred during the processes in FIG. 12.

The decision block of step 1510 determines that if the sum of the current of Upper and Lower outlets and the downstream current is greater than 6 ma, then there is a GFI fault and the three power/Triacs are to be turned off for both the upper and lower outlets as well as for the downstream power. The signal Led Fault is turned ON and GFI Fault Flag is set. More specifically, step 1506 processes values in the Data Table 1508 and sums the RMS (average) values for the upper (7), lower (8) and down current (10). Decision block 1510 then determines if this sum is greater than the White Current (4) on a sample by sample basis than a predetermined current (in this embodiment 6 mA has been used), and if not, then there is no GFI fault.

Step 1510 compares the sum of individual values Upper, Lower and Down in 200-299, 300-399, 500-599 respectively, against the value of the matching white values in 400. If this sum of the upper, lower and downstream as compared to the White Current than 6 mA, then a fault is determined and 1512 turns off the power triac(s), whether for the upper or lower outlet and the downstream. The Fault LED is turned ON and the GFI Fault Flag is enabled. Optionally, following a predetermined period of time (e.g. 15 minutes), the system may auto reset, and test if the GFI fault still is present. If not, the system may automatically restart.

Figure 16:
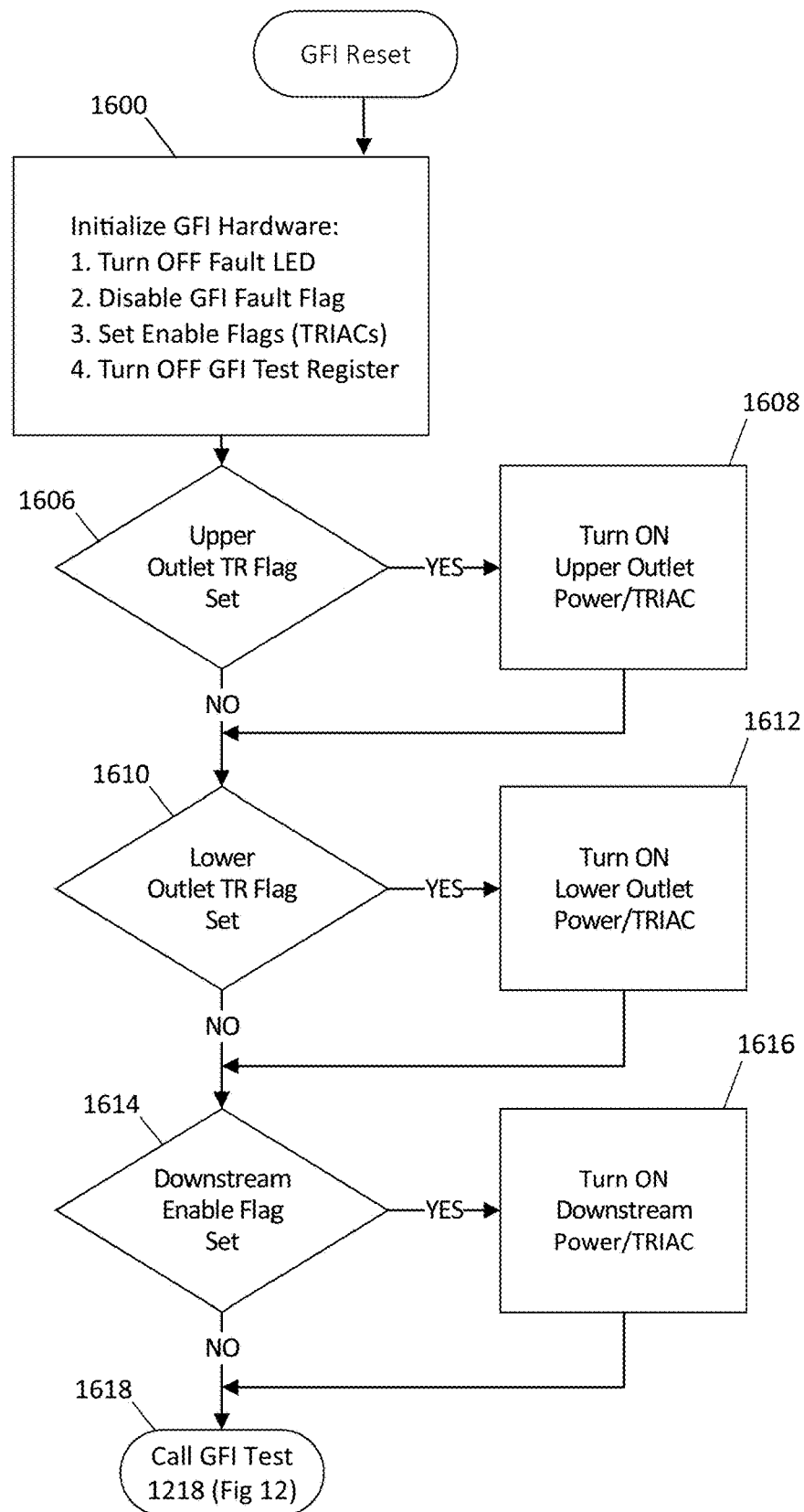
FIG. 16 is an GFI reset process flowchart for the circuits of FIGS. 6A-A, 6A-B, 6B, 7A, 7B-A, 7B-B, 7C and 8.

FIG. 16 is a GFI reset process flowchart. This GFI Reset routine block 1600 initializes GFI Hardware by turning OFF Fault LED, disabling the GFI Fault Flag, setting Enable Flags (TRIACS), and turning off the GFI Test Register. Decision blocks of steps 1606, 1610 and 1614 establish if certain Power/TRIACs are to be turned on, depending on whether upper outlet TR flags, lower outlet TR flags and downstream enable flags having been set. Similar to the process in the flowchart of FIG. 14 which turns on power/Triacs used for any or all the upper, lower and/or downstream functions, the GFI reset process turns on any or all of the three Triacs during a GFI Reset process. Following reset, the process step 1618 continues to the GFI Test 1218, FIG. 12.

Figure 17:
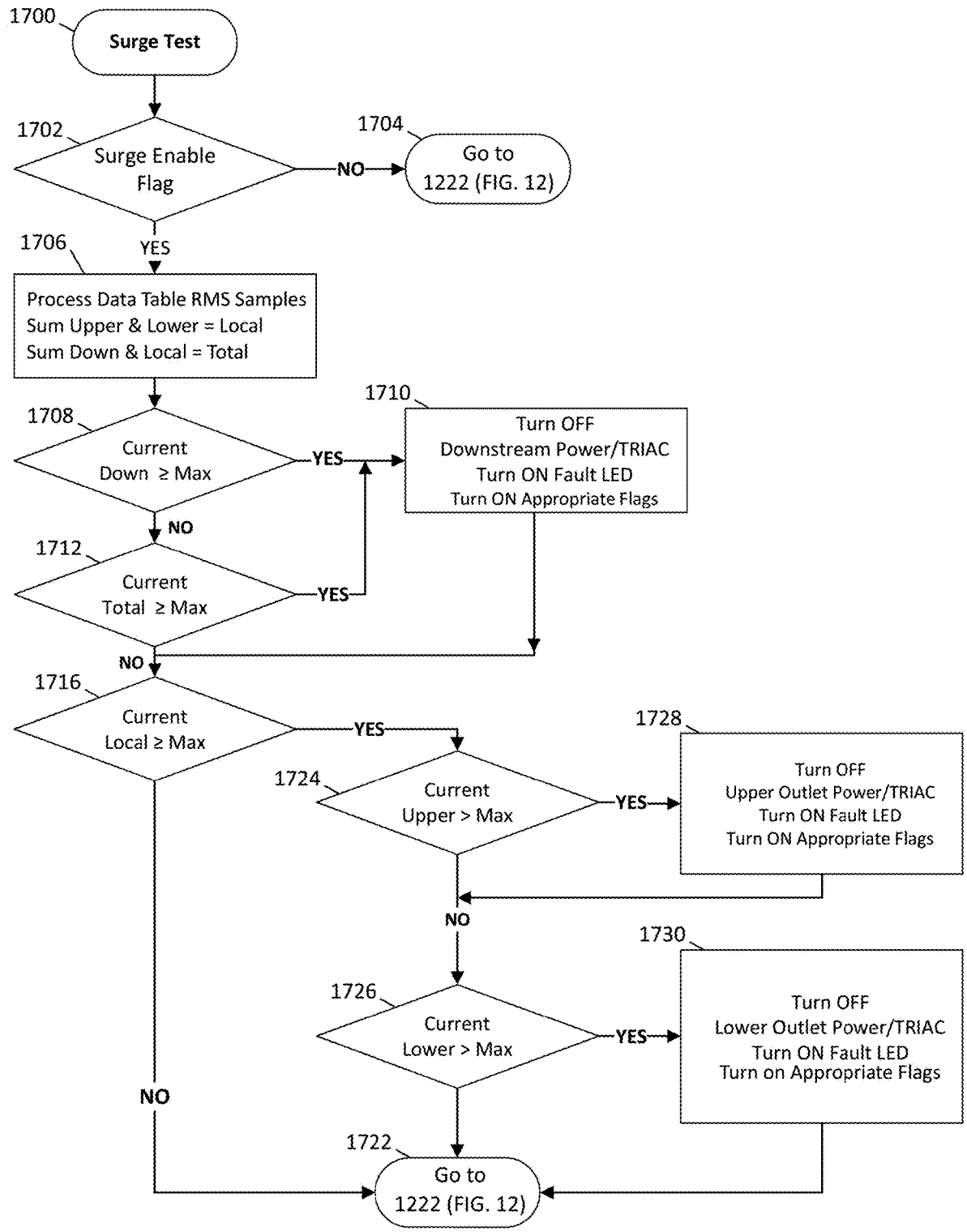
FIG. 17 is a surge test process flowchart for the circuits of FIGS. 6A-A, 6A-B, 6B, 7A, 7B-A, 7B-B, 7C and 8.

FIG. 17 is a surge test process flowchart for turning off power/Triacs for overcurrent and surges. The decision block of step 1702 determines if there is a flag indication that Surge Protection is a feature in the outlet. If not, the process returns to FIG. 12 block 1222 and proceeds to call the Auto/Self Test routine.

If the Surge test feature is enabled as indicated by the presence of a Surge Enable Flag at step 1702, it has been determined that there is no Arc Fault occurring, and that there is no current imbalance between Hot and Neutral (GFI). At step 1706, Data Table samples are processed and the process continues to decision steps 1708, 1712, and 1716 to determine if current exceeds the permissible level (15 Amperes or 20 Amperes). Certain overages over the MAX may be permissible for a limited time duration to provide for cases of a limited surge such as a motor start-up.

Step 1706 processes the Data Table Samples (Block 1508): The Local Power is totaled "Local" by adding the RMS values of the Upper and Lower outlets, assuming two outlets are active in the receptacle. Then the sum of the Downstream RMS and the Local RMS generates "Total" Power. The decision blocks 1708 and 1712 then determine if the Downstream Current or Total Current, respectively, is greater than or equal to Max, in which case step 1710 turns off the Downstream Power/Triac, and turns ON Fault LED and appropriate flags. Max is a preset value based on whether the outlet is operating in 15 A or 20 A mode.

There is the capability to determine the Max current parameter depending upon the presence of 15 A or 20 A plug blade. For example, it may be permissible to draw 100% continuous current or 120% for less duration to provide for start up time such as inrush for a hair dryer or air conditioner. Decision block 1716 compares the Local value (sum of both Upper and Lower outlet) to the Max Current Parameter value. If greater, decision blocks 1724 and 1726 compare each of the upper and Lower outlets, shutting off the respective Power/Triacs and turning on the respective Fault LED(s).

FIG. 18 lists the elements in the Data Table. These are preset or accumulated, and/or processed during the execution of various routines. Of the 1 to 5 signals being monitored, 1, 2, 3 and 5 are done on the black input, and 4 ("WHT") is the return path. Current related information is used for GFI, Surges and Overcurrent processing; voltage, for AFCI serial, overvoltage and brownouts. The Sample Counter (0) is preset to a value of 5 as the embodiments are monitoring 5 current, or voltage values: Black Voltage, Upper Black Current, Lower Black Current, Down Black Current and White ("WHT") Current. Timers 21 to 26 are for tracking how long the events occurred. BLK shows individual load current drawn and WHT is the return path for all currents unless there is a fault.

Figure 19:
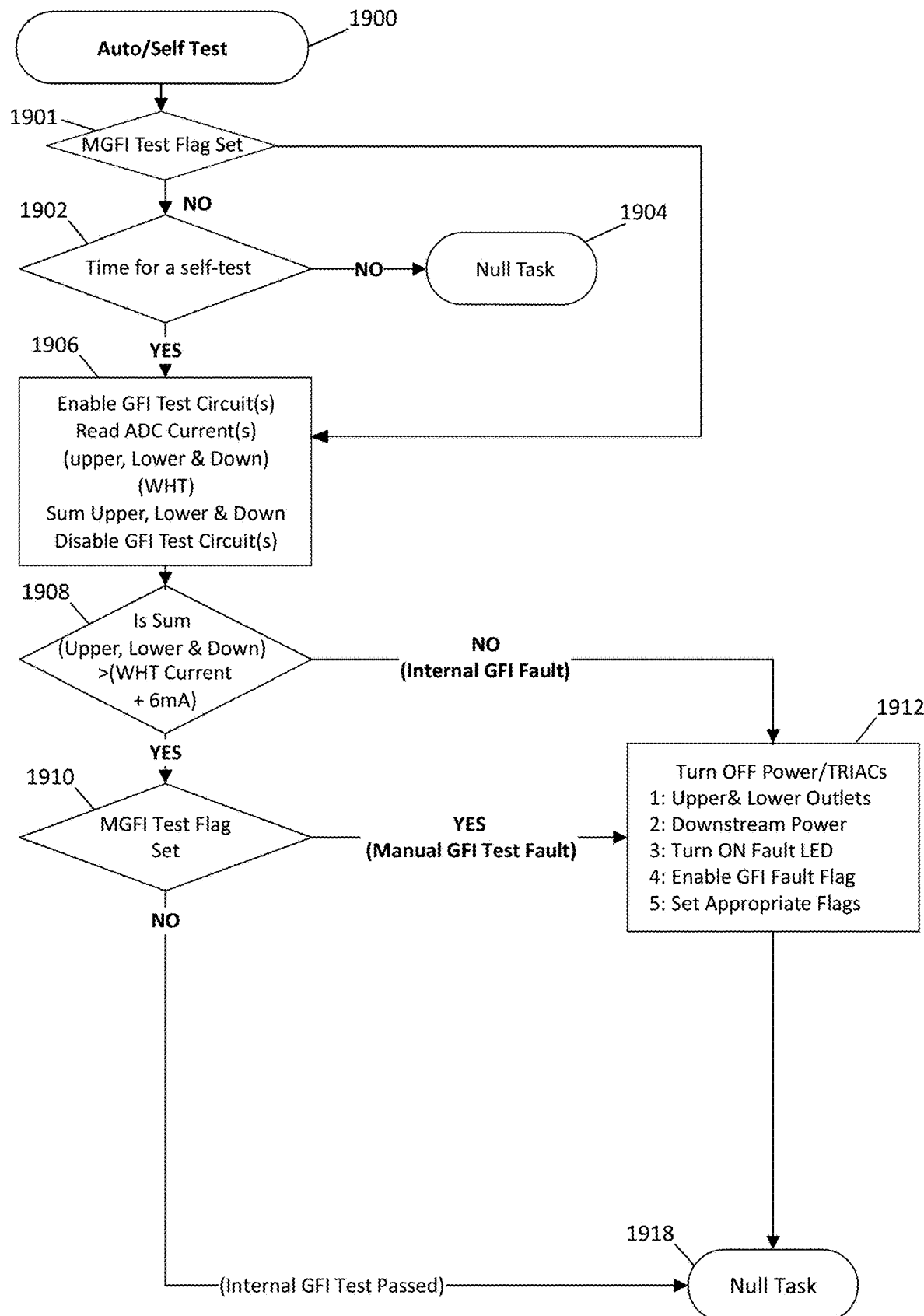
FIG. 19 is an auto/self-test process flowchart for the example embodiment.

FIG. 19 is an auto/self-test process flowchart that is initiated from FIG. 12, block 1222 and is primarily for auto/self testing of the system's hardware including but not limited to the GFI function (decision block 1908). The system may also test information from other sensors for calibration, temperature, etc.

If step 1901 determines that this is a manual test, then the processes in block 1906 are initiated. If a fault has been determined, the power is turned off at step 1904. Whether a self test as established in step 1902, or a manual test as determined in step 1901, step 1906 enables the GFI test circuit, reads the ADC values for the Upper, Lower, the White, and the Black & the White downstream, sums the Upper and Lower values, and disables the GFI Test Circuits.

Step 1908 tests whether an imbalance has occurred. If it was a manual test, the process continues to 1912. If it was an internal test and failed, the power is turned off. If is determined in step 1910 that a manual test failed, the power is turned off.

Figure 8:
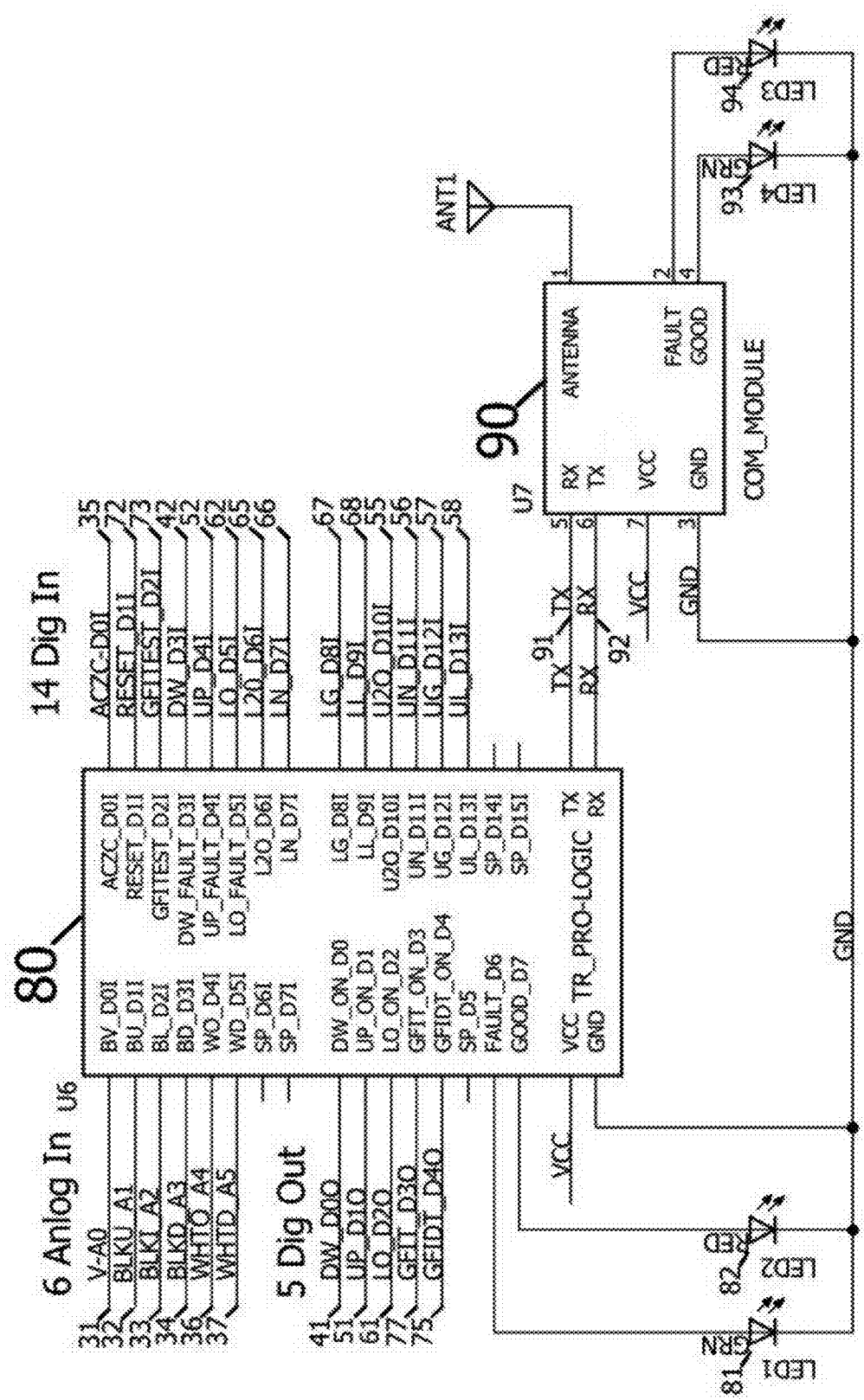
FIG. 8 is a detailed schematic representation of the processor, communications module and logic elements of the circuit diagrams of FIGS. 6A-A, 6A-B, 6B, 7A, 7B-A, 7B-B, 7C.
Figure 20A:
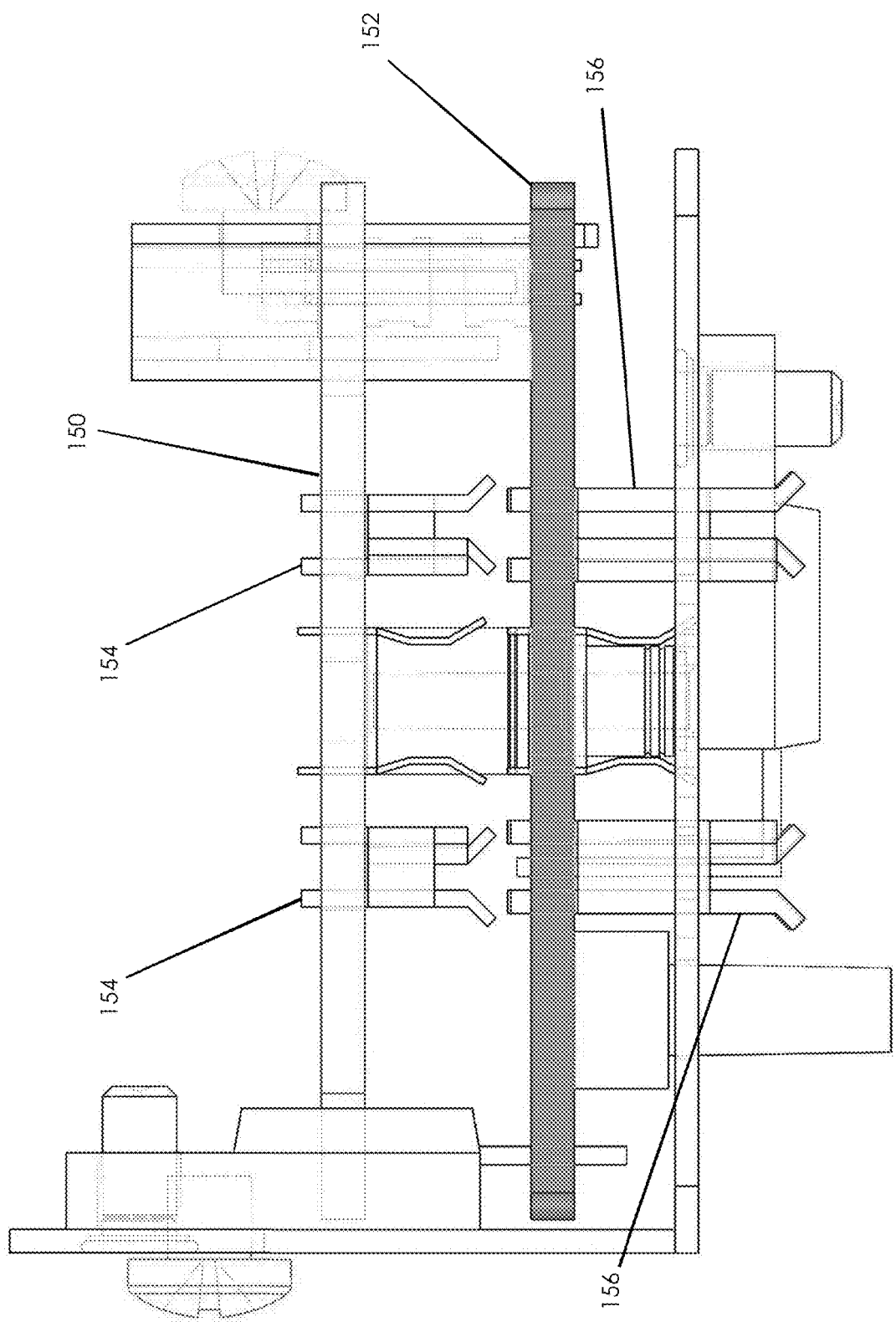
FIG. 20A is a plan view of the receptacle of example embodiment.

FIG. 20A is a partial plan view of a physical layout of a receptacle, such as described with respect to FIGS. 1A-1F, operable by means of the circuits of FIGS. 6-8. A plug has not been inserted in the receptacle. FIG. 20A illustrates the receptacle of FIG. 20A with insertion of plug 160. Power circuit board 152 includes two sprung contacts 156. Daughter circuit board 150 includes two sprung contacts 154. Circuit board 152 includes sprung contacts 156.

Figure 20B:
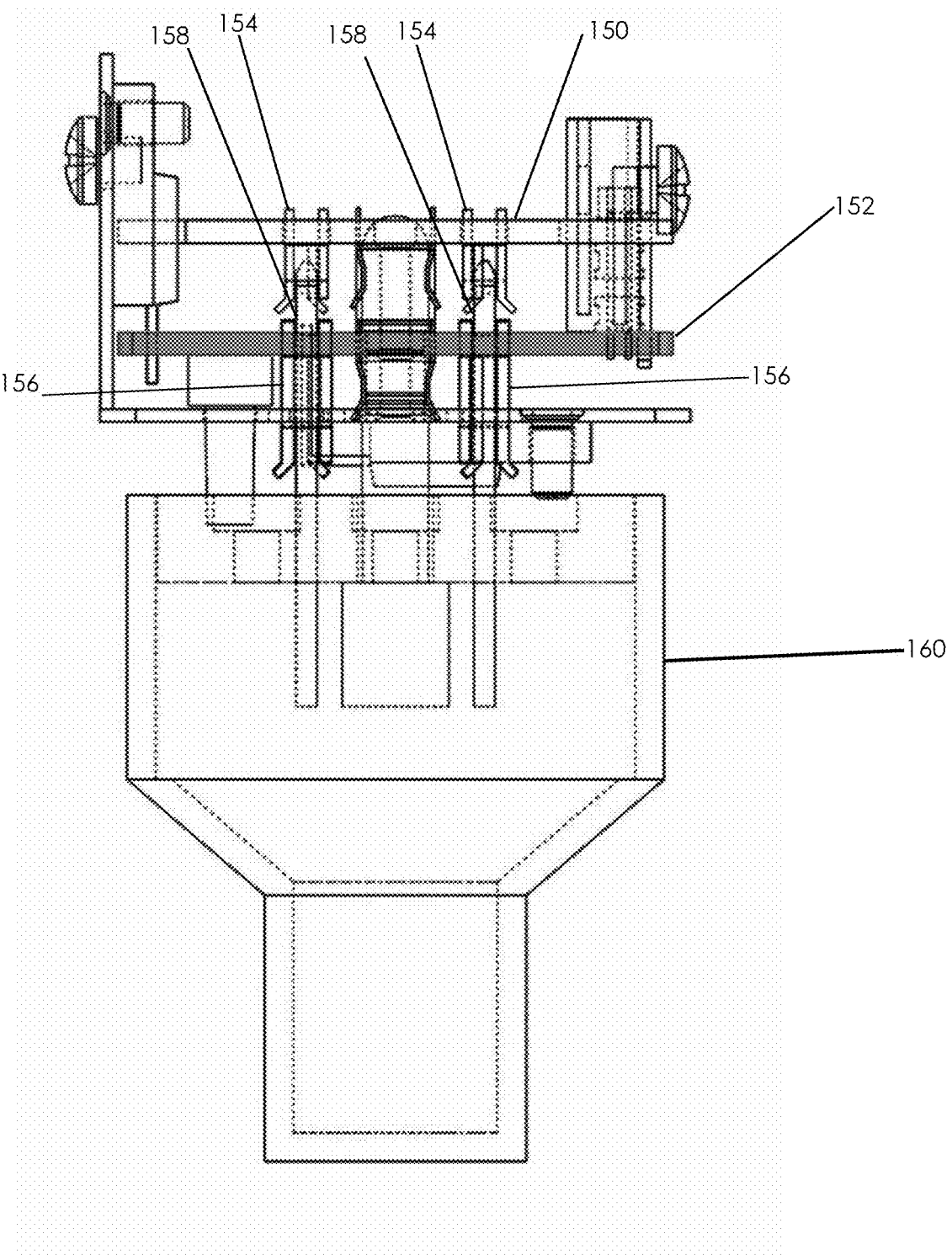
FIG. 20B is a view of the receptacle from FIG. 20A with a plug inserted.

Boards 152 and 156 are substantially parallel to, and separated from, each other. Contacts 154 and 156 are aligned with each other, bridged across the separation by inserted plug blades 158, as shown in FIG. 20B. The two circuit boards allow separation between the high voltage power control logic components on circuit board 152 and circuit board 150, the latter containing sensing logic and communication components. More particularly, the voltage sensing, control, connection of high voltage to the plug pins, device power interconnect lines (Upstream [BLK/WHT IN]/Downstream [BLK/WHT Out]) 30 are included on power circuit board 152. Plug pin sensing logic elements are include on circuit board 150. This arrangement provides high efficiency of the power circuitry, as the high current traces are all together. Ability of the GFI & AFCI protection is afforded to measure the currents on both the neutral as well as on the hot lines, and to reliably measure a fine current imbalance, for example as little as six milliamps.

Full insertion of plug 160 completes circuit connection of microcontroller 80 with low voltage sensor circuits 55, 56, 57, 58 and 65, 66, 67, 68, depicted in FIGS. 6, 7B-A, 7B-B and 8. microcontroller 80 monitors the sensor contacts to determine whether the power is to be turned on or off. Circuit board 150 monitors the contact sensors to determine the insertion time of the plug neutral and hot blades. Ground prong 57, 67 insertion time is also assessed. The ground prong is longer than the hot and neutral blades. If a ground plug is present, it is detected first to establish distinctive timing criteria. The microcontroller will wait for the other blades to be inserted.

Separation of the current sensors to a single board facilitates measurement of precision, calibration, and long term stability. There is no need to tamper with any of the high voltage variables that are stable, having already been calibrated. The separated board makes provision for addition of other communication functions, e.g, Bluetooth, Zigbee, WiFi power line communications while limiting the number of signals traveling between the two circuit boards.

Figure 21:
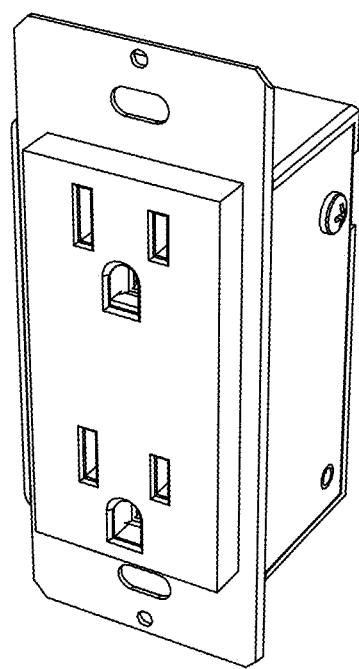
FIG. 21 is an isometric view the example embodiment of the receptacle with side heat sink.
Figure 22:
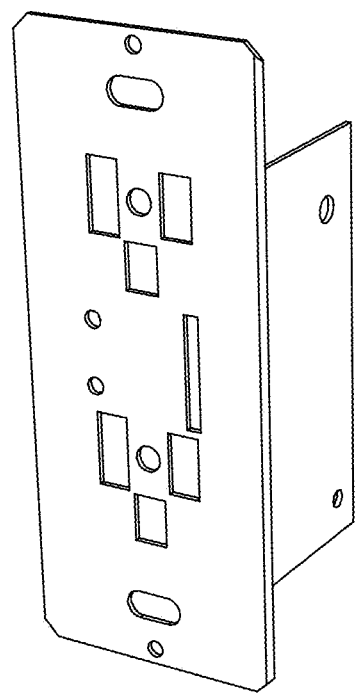
FIG. 22 is a partial view of the receptacle of FIG. 21 shown with a ground plate.
Figure 23:
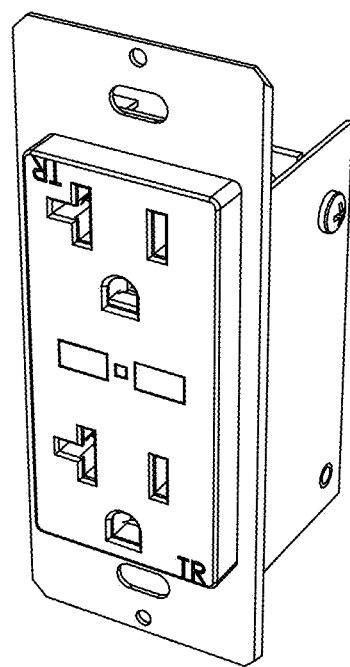
FIG. 23 is an isometric view of the example embodiment for a 15/20 A receptacle.
Figure 24:
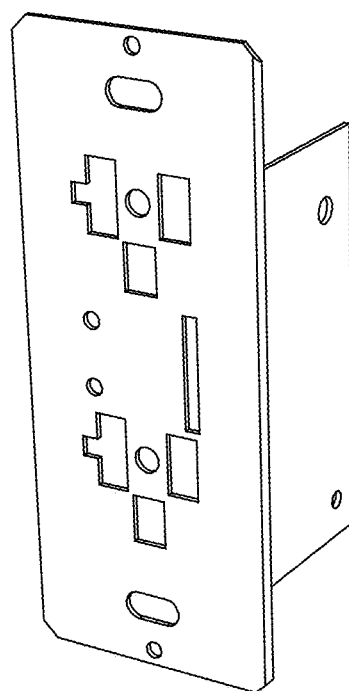
FIG. 24 is a partial view of the receptacle shown in FIG. 23 with ground plate and heat sink flange.
Figure 25A:
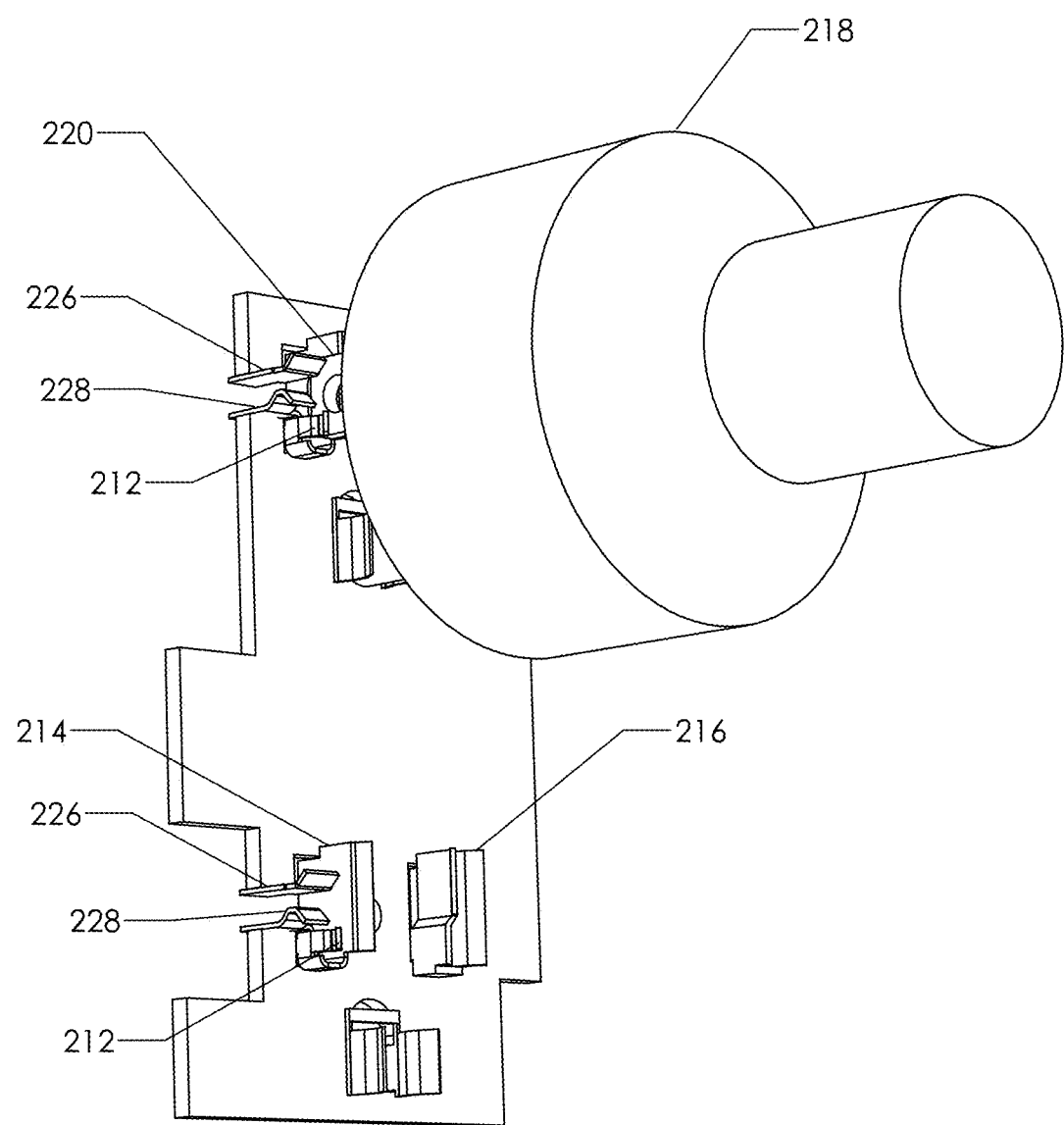
FIGS. 25A-25E are various views of a 15 A plug inserted into a daughter board of the receptacle shown in FIG. 23.
Figure 25B:
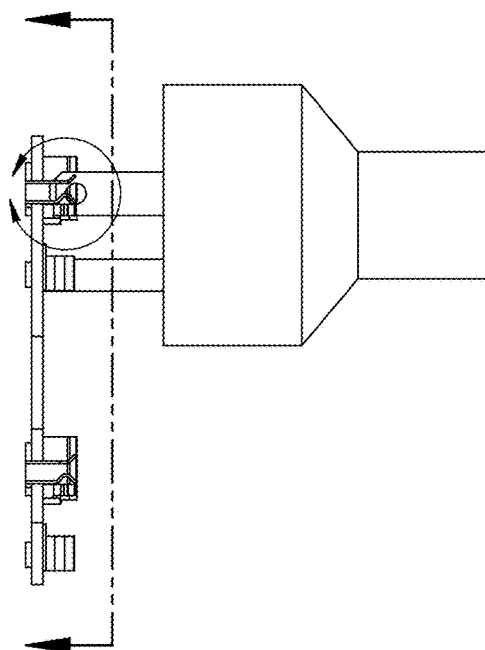
Figure 25C:
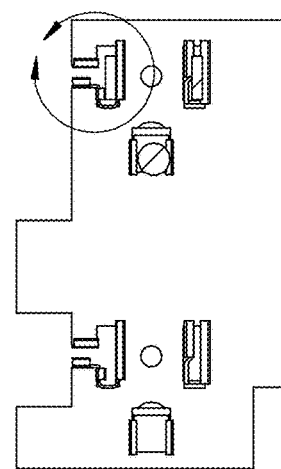
Figure 25D:
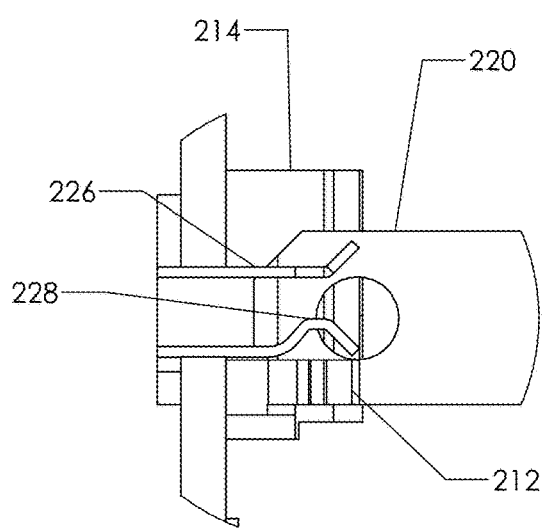
Figure 25E:
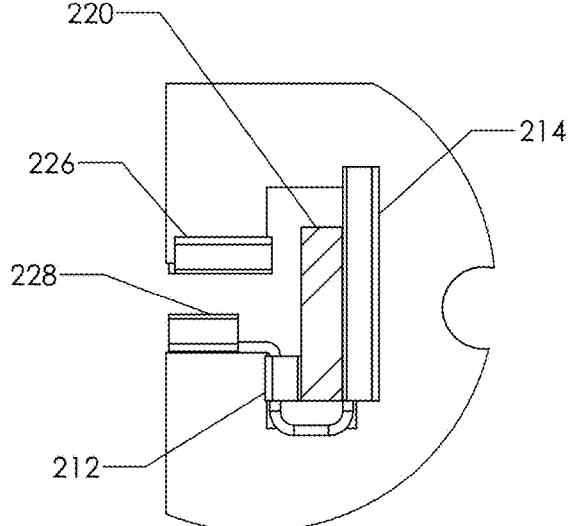
Figure 26A:
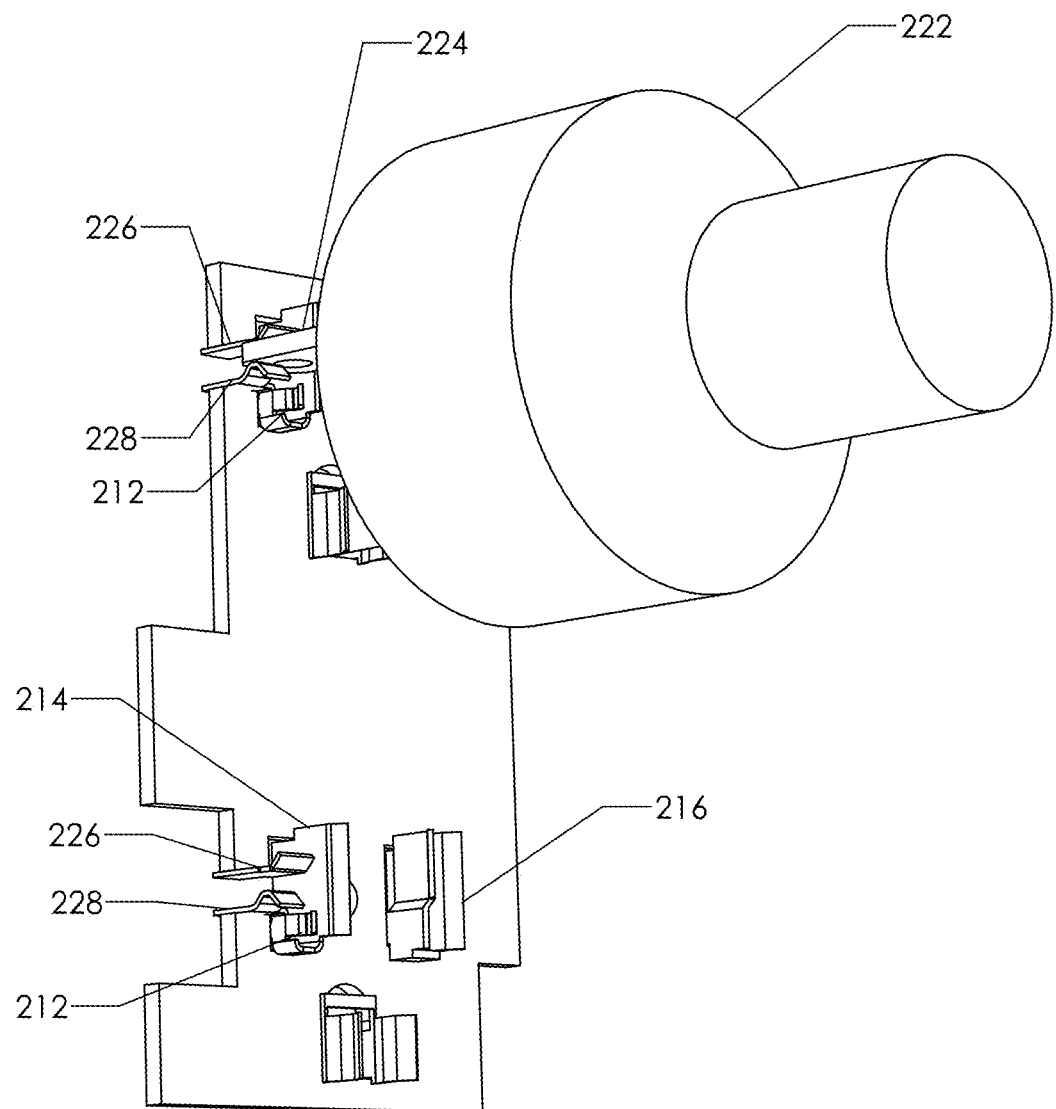
FIGS. 26A-26E are various views of a 20 A plug inserted into the daughter board of the receptacle shown in FIG. 23.
Figure 26B:
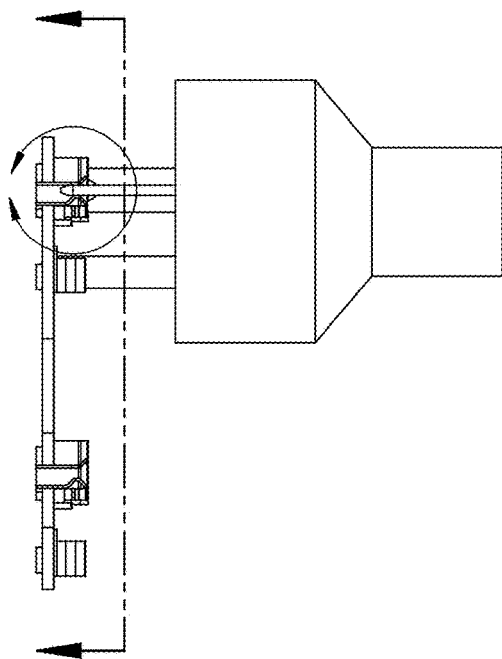
Figure 26C:
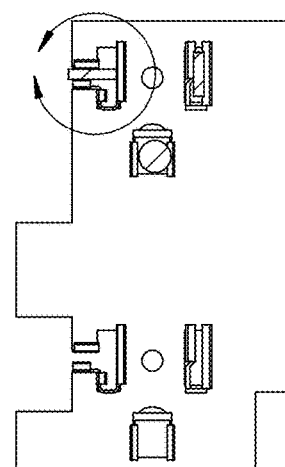
Figure 26D:
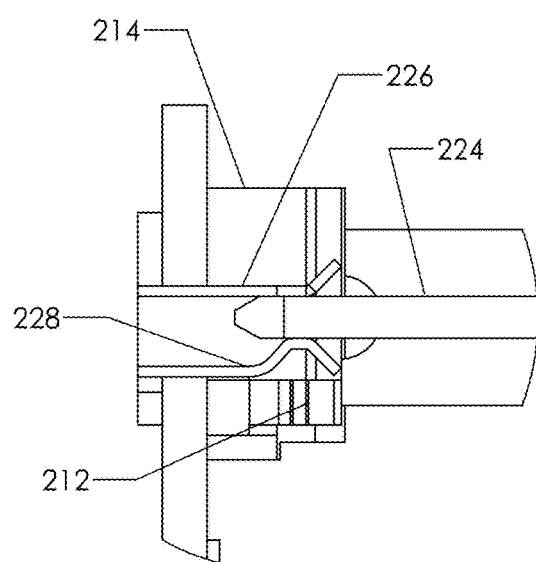
Figure 26E:
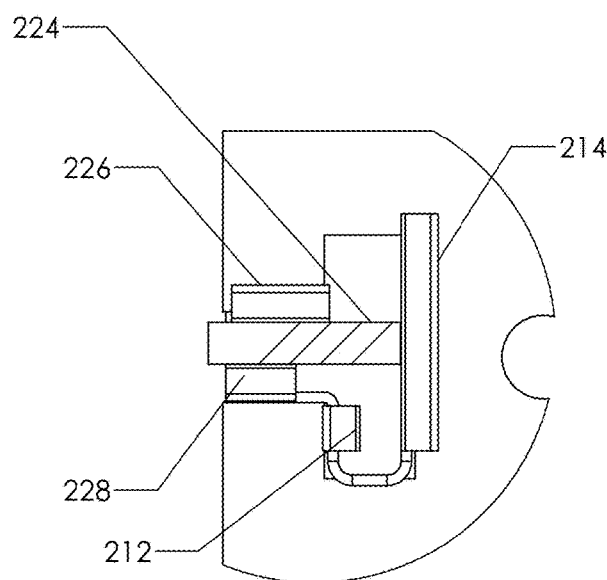

The reliability and lifespan of electrical components are enhanced by maintaining them at a relatively low temperature. FIGS. 21 and 22 exemplify provision in the receptacle of an oversized ground plate that acts as a heat sink for the electrical thermal components that generate heat, such as the exemplified TRIACs. A ground plate width and height are maximized on the front face. A bent flange on the receptacle side adds to the surface area and strength for heat dissipation. The ground plate may be constructed of galvanized steel or alternate thermal conductive materials. Fins may be added to maximize heat conduction surface area. FIG. 23 exemplifies a 15/20 A embodiment of the receptacle. FIG. 24 depicts ground plate with heat sink flange for the receptacle shown in FIG. 23.

Referring to FIGS. 25A-25E, a 15 A plug 218 is inserted into the daughter board of the receptacle shown in FIG. 23. FIGS. 26A-26E illustrate insertion of a 20 A into the daughter board of the receptacle shown in FIG. 23. Sprung contacts 212 and 214 and 228 sense insertion of neutral blade 220. Hot sprung contact 216 only senses the insertion of the hot plug blade. A neutral blade 220 for a 15 A plug mates only with neutral sprung contacts 212 and 214, as depicted in FIGS. 25A-25E. Additional mating with contact 226 occurs only for insertion of a 20 A plug, depicted in FIGS. 26A-26E. Blades 214 and 216 are sensed to determine the arrival time of each of the blades to confirm insertion of a plug rather than foreign objects. The orientation of the blades is also sensed by the contacts in order to determine if the plug configuration is for a 15 A appliance or a 20 A appliance 226. On the neutral side, there is the possibility of two neutral plug blade orientations.

Figure 27A:
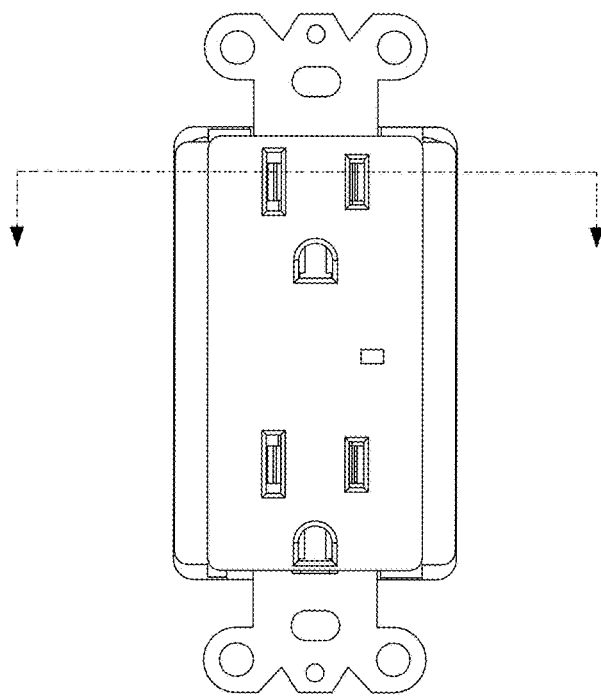
FIG. 27A is a front view of an example receptacle embodiment with micro-switch implementation for blade detection.
Figure 27B:
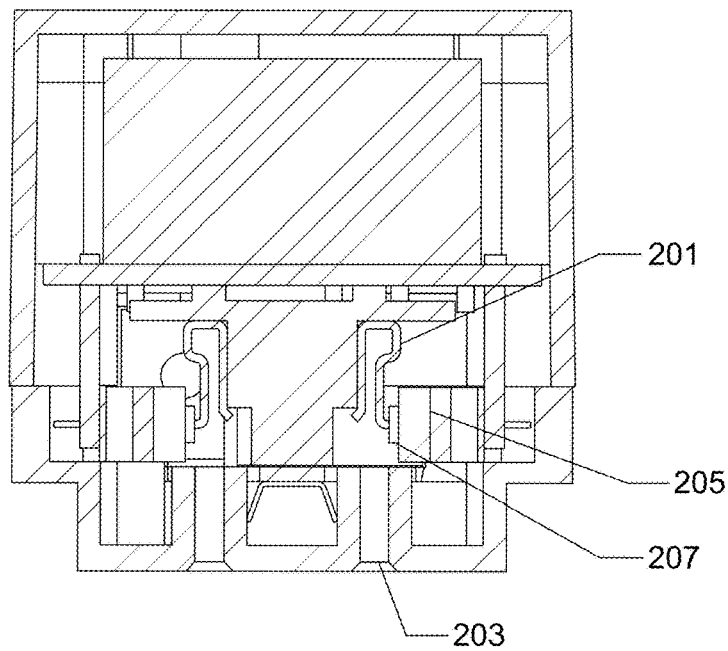
FIG. 27B is a section view taken from FIG. 27A.

Referring to FIGS. 27A-27B, micro switches 205 are used to determine whether there is full insertion of a plug blade. Sprung contacts depress switch push buttons upon insertion. Micro switch plunger 207 is depressed by the sprung contact 201 that is deformed when a plug blade is inserted into the outlet socket 203. The side of the plug blade is used to determine insertion time. because the variation in blade length allowed by standard is quite large.

Figure 28:
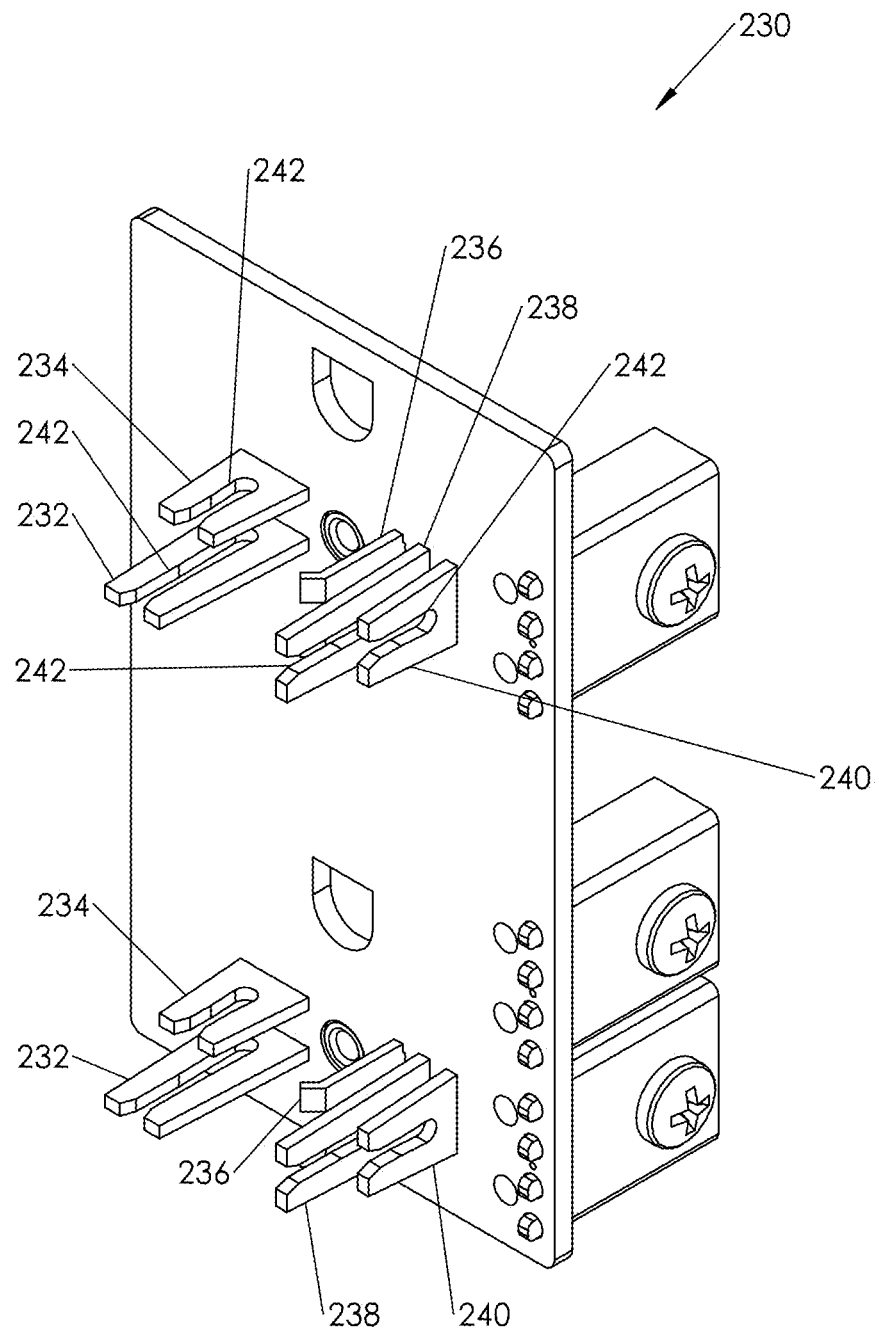
FIG. 28 is an isometric view of single circuit board of the embodiment of FIGS. 20A and 20B.
Figure 29:
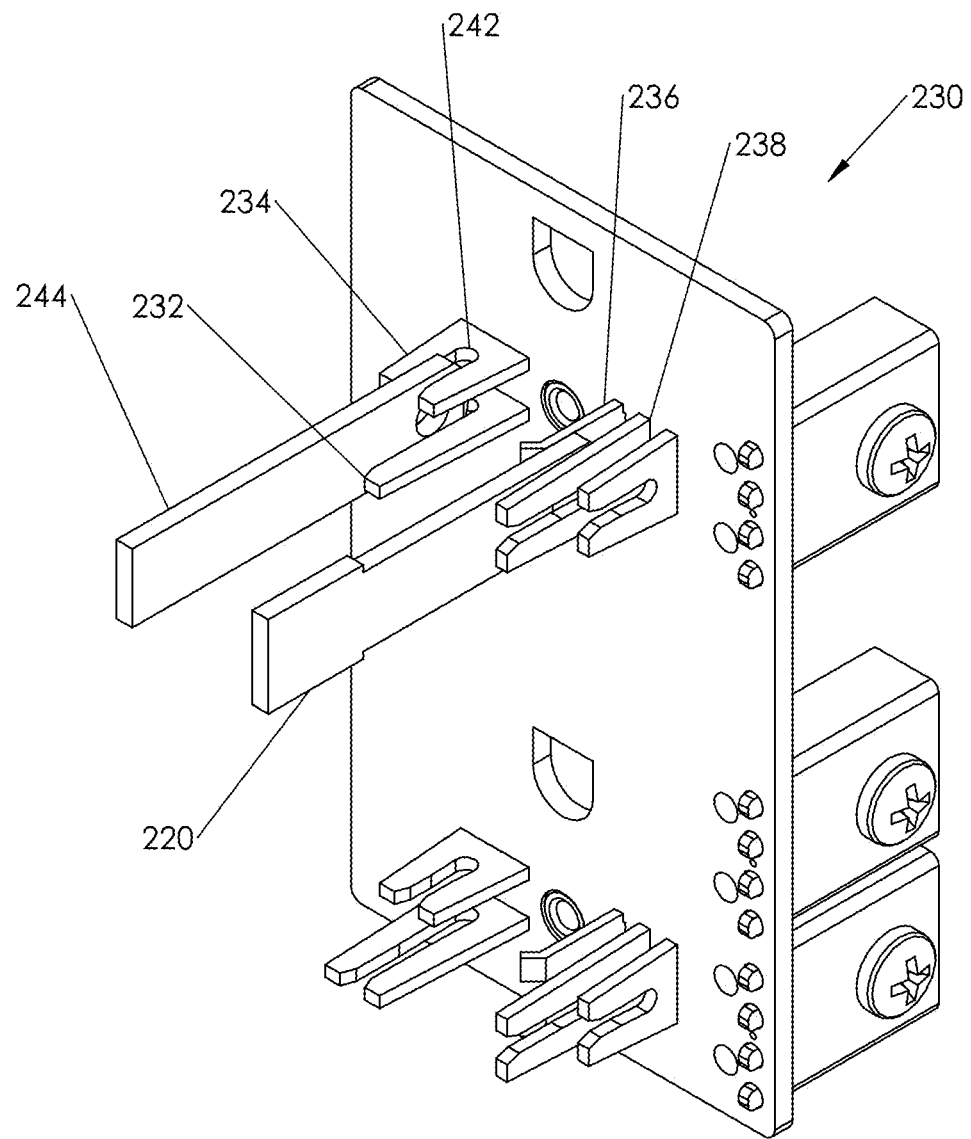
FIG. 29 is an isometric view of the blades of a plug in the single circuit board embodiment shown in FIG. 28.
Figure 30:
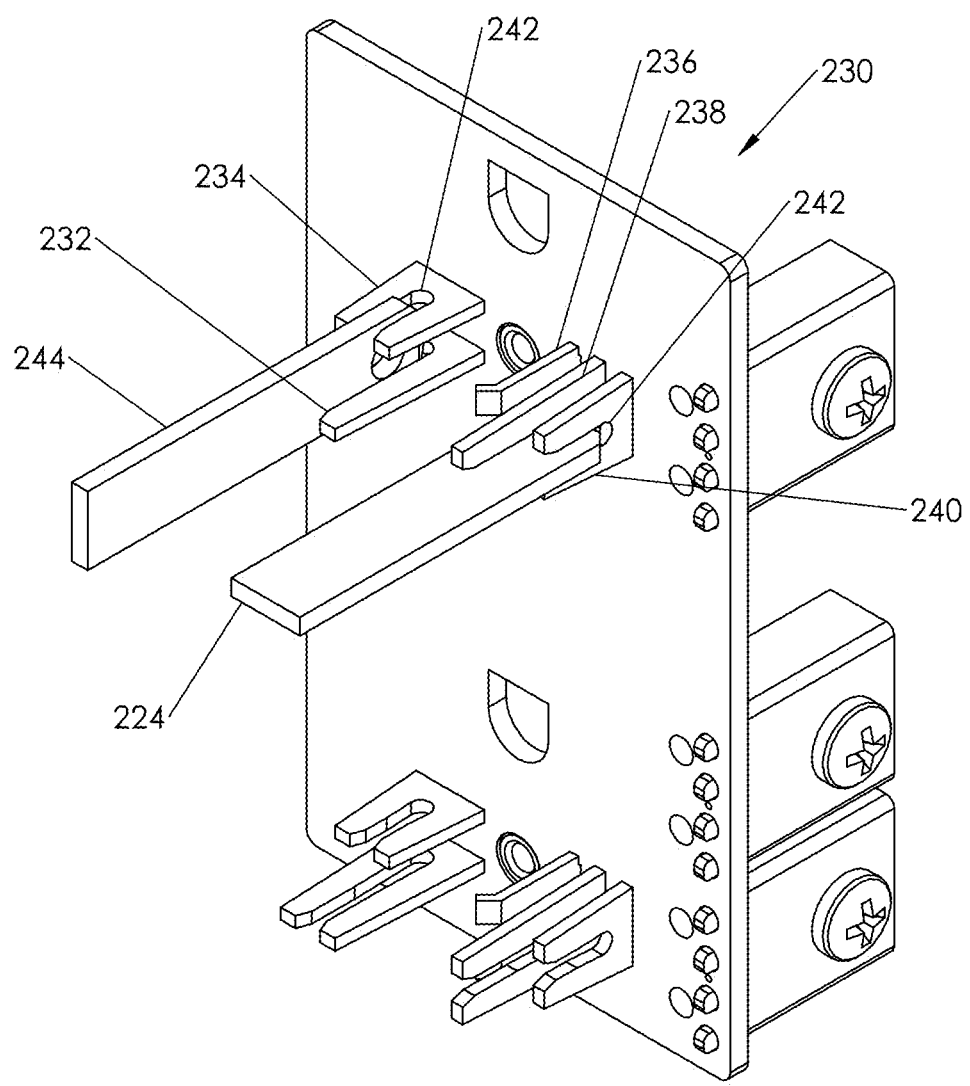
FIG. 30 is an isometric view of blades of a 20 A plug in the single circuit board embodiment shown in FIG. 28.

FIG. 28 is an isometric view of single circuit board that used both to sense blade insertion and supply power to the blades of the receptacles of FIGS. 25 and 26. The receptacle housings and ground plate have been hidden for clarity. FIG. 29 depicts insertion of a 15 A plug in the circuit board of FIG. 28. FIG. 30 depicts insertion of a 20 plug in the circuit board of FIG. 28. This configuration of contacts allows assessment of the arrival of blades and supply of power to the power contacts. Identification of whether a 15 A plug or 20 A plug has been inserted permits setting of the maximum trip current of the outlet.

For each of the two outlets of circuit board 230, there are two sprung hot contacts 232 and 234. Hot contact 232 supplies power to the hot power blade. Hot contact 234 is the sensing contact. For each of the two outlets of circuit board 230, there are three sprung neutral contacts 236, 238 and 240. Neutral contact 236 is the 15 A sensing contact, neutral contact 238 is the power contact and neutral contact 240 is the 20 A sensing contact.

Hot blade 244 closes the circuit between hot contacts 232 and 234, effectively sensing the arrival of the blade. Slots 242 in contacts 232, 234, 238 and 240 are sized slightly smaller than the thickness of the blade to allow the contacts to spring outwardly when a blade is inserted and apply pressure on the blade ensuring electrical conduction.

Neutral 15 A blade 220 closes the circuit between neutral 15 A sensing contact 236 and neutral power contact 238. Neutral 15 A sensing contact 236 is positioned at a distance, slightly less than the thickness of neutral 15 A blade 220, away from neutral power contact 238. When neutral 15 A blade is inserted neutral 15 A sensing contact flexes allowing the blade to be inserted and apply pressure on the blade ensuring electrical conduction.

Neutral 20 A blade 224 closes the circuit between neutral power contact 238 and neutral 20 A sensing contact 240. Neutral 20 A blade 224 does not contact neutral 15 A sensing contact 236 due to a clearance slot.

In this disclosure there are shown and described only exemplary embodiments and but a few examples of its versatility. It is to be understood that the embodiments are capable of use in various other combinations and environments and are capable of changes or modifications within the scope of the inventive concept as expressed herein. For example, the term "processor" has been used in this disclosure in a generic sense to include integrated circuits such as microprocessor, microcontroller, control logic circuitry, FPGA, etc. The terms "upstream" and "downstream" are used to refer to the respective relative direction in relation to the circuit branch originating at the electrical supply. The term "socket" has been used to indicate an individual contact of the outlet to mate with an individual plug prong. The terms plug "prong" and plug "blade" have been used interchangeably. While optical sensors have been illustrated, the concepts disclosed herein are applicable to the use of other equivalent sensors. Moreover, the data tables are shown as 1208, 1304, 1508 to relate to flow chart FIGS. 12, 13, 15 and 18. A single memory table of processor 80 comprises all of the described data tables.

The disclosure illustrates, but is not limited to, receptacles which typically include two outlets. The concepts of this disclosure are applicable to other receptacles of multiple other multiple outlets, one of which may lack a series switch. Moreover, although an electrical receptacle is described an example embodiment, the application of the features and means of accomplishing them are not limited to an electrical receptacle. While switches 2211 and 2213 of FIG. 2 are depicted as being tripped by an object inserted in the N socket, such tripping can, instead, occur from insertion of an object in the L socket. While a maximum time period of 25 ms for source connection has been exemplified in the description of FIGS. 2 and 3, a different time period is within the contemplation of this disclosure.

The disclosed concepts are applicable to power strips, power bars, extension cords, receptacle adaptors, circuit breakers, and other devices that provide electrical power via outlets for a matching plug, or other connectors. While a North American 110V 60 Hz receptacle is exemplified herein, the disclosed concepts are applicable to other international receptacles or devices. Similarly, the disclosure is not limited to plug blades as the mating means for the receptacle outlet, but is applicable interchangeably to other plug configurations such as found in other international standards. Moreover, although the present disclosure has been exemplified in a single phase alternating current context, the disclosure is operable in the contexts of direct current and three-phase systems.

What is claimed is:

1. An electrical receptacle comprising:
    at least one plug outlet comprising prong socket contacts configured for electrical connection to a hot power line and a neutral power line, respectively;
    a first circuit board including a hot line prong socket for each said plug outlet, said first circuit board comprising first circuitry for electrical connection from the hot power line to each hot line prong socket; and
    a second circuit board spatially separated from the first circuit board, said second circuit board comprising a neutral line prong socket for each said plug outlet and second circuitry for electrical connection from the neutral power line to each neutral line prong socket.

2. An electrical receptacle as recited in claim 1, wherein the first circuit board is configured generally parallel to the second circuit board.

3. An electrical receptacle as recited in claim 1, wherein the first circuit board and the second circuit board are generally planar and configured in parallel relationship to an insertion direction of the at least one plug outlet.

4. An electrical receptacle as recited in claim 1, further comprising at least one processor configured to output a control signal to activate electrical connection from the hot power line to a corresponding said prong socket.

5. An electrical receptacle as recited in claim 4, further comprising a controlled switch controlled connected between a respective hot line prong socket and the hot power line, a control electrode of said switch coupled to the output of the processor for hot line electrical connection activation.

6. An electrical receptacle as recited in claim 1, wherein the first circuitry comprises high power control circuitry and the second circuitry comprises low power logic control circuitry.

7. An electrical receptacle as recited in claim 1, wherein the first circuitry comprises high power control circuitry and the second circuitry comprises communication function circuitry.

\* \* \* \* \*